(12) United States Patent
Haldorsen et al.

(10) Patent No.: US 8,208,341 B2
(45) Date of Patent: Jun. 26, 2012

(54) PROCESSING OF COMBINED SURFACE AND BOREHOLE SEISMIC DATA

(75) Inventors: Jakob Brandt Utne Haldorsen, Somerville, MA (US); Scott W. Leaney, Katy, TX (US); Douglas E. Miller, Boston, MA (US); Richard Timothy Coates, Middlebury, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 505 days.

(21) Appl. No.: 12/248,659

(22) Filed: Oct. 9, 2008

(65) Prior Publication Data
US 2009/0097356 A1  Apr. 16, 2009

Related U.S. Application Data

(63) Continuation-in-part of application No. 10/987,907, filed on Nov. 12, 2004, now Pat. No. 7,508,733.

(60) Provisional application No. 60/520,175, filed on Nov. 14, 2003.

(51) Int. Cl.
*G01V 1/28* (2006.01)
*G01V 1/36* (2006.01)
(52) U.S. Cl. ............... 367/24; 367/43; 367/38; 367/57
(58) Field of Classification Search .............. 181/108, 181/111, 112; 367/23, 32, 38, 46, 48, 54, 367/57, 58; 702/17
See application file for complete search history.

(56) References Cited

U.S. PATENT DOCUMENTS

| | | | |
|---|---|---|---|
| 3,705,382 A | 12/1972 | Quay | |
| 4,646,274 A | 2/1987 | Martinez | |
| 4,715,021 A | 12/1987 | Dittert | |
| 4,926,391 A | 5/1990 | Rector et al. | |
| 5,010,976 A * | 4/1991 | Airhart | 181/108 |
| 5,148,407 A * | 9/1992 | Haldorsen et al. | 367/32 |
| 5,191,557 A | 3/1993 | Rector et al. | |
| 5,253,217 A * | 10/1993 | Justice et al. | 367/46 |
| 5,400,299 A | 3/1995 | Trantham | |
| 5,461,594 A | 10/1995 | Mougenot et al. | |
| 5,550,786 A * | 8/1996 | Allen | 367/48 |

(Continued)

FOREIGN PATENT DOCUMENTS

GB 2365529 A 2/2001

(Continued)

OTHER PUBLICATIONS

Xiao-Ping Li, "Decomposition of vibroseis data by the multiple filter technique," Geophysics, May-Jun. 1997, vol. 62 (3): pp. 980-991.

(Continued)

*Primary Examiner* — Jack W Keith
*Assistant Examiner* — Daniel L Murphy

(57) ABSTRACT

Methods and related systems are described for processing surface seismic data. Surface seismic data representing seismic signals detected at a plurality of surface locations is wavefield deconvolved using a combination of direct wave travel times estimated from borehole seismic data, and wavefield energy estimated from the surface seismic data.

20 Claims, 20 Drawing Sheets

U.S. PATENT DOCUMENTS

| | | | |
|---|---|---|---|
| 5,570,833 A | 11/1996 | Dusek | |
| 5,715,213 A | 2/1998 | Allen | |
| 5,721,710 A | 2/1998 | Sallas et al. | |
| 5,764,516 A * | 6/1998 | Thompson et al. | 702/17 |
| 5,790,473 A | 8/1998 | Allen | |
| 5,946,271 A | 8/1999 | Dragoset | |
| 6,131,694 A | 10/2000 | Robbins et al. | |
| 6,393,366 B1 | 5/2002 | Saggaf | |
| 6,807,489 B2 * | 10/2004 | Naville et al. | 702/17 |
| 2004/0122596 A1 | 6/2004 | Sudhakar et al. | |

FOREIGN PATENT DOCUMENTS

| | | |
|---|---|---|
| WO | 2004031806 A2 | 10/2003 |
| WO | 2004031806 A2 | 4/2004 |

OTHER PUBLICATIONS

Jakob B. U. Haldorsen et al., "Multichannel Wiener deconvolution of vertical seismic profiles," Geophysics, Oct. 1994, vol. 59(10): pp. 1500-1511.

* cited by examiner

PROCESSING OF COMBINED SURFACE AND BOREHOLE SEISMIC DATA

CROSS-REFERENCE TO RELATED APPLICATIONS

This patent application is a continuation-in-part of U.S. Ser. No. 10/987,907 filed Nov. 12, 2004, which claims priority from U.S. Provisional Ser. No. 60/520,175 filed Nov. 14, 2003, each of which is incorporated by reference herein.

BACKGROUND OF THE INVENTION

1. Field of the Invention

This patent specification relates to the processing of seismic data and, more particularly, to processing of combined surface-recorded vibratory seismic data and borehole-recorded vibratory seismic data.

2. Background of the Invention

Surface-seismic waveform data are used to generate images of the sub-surface geological structures. In principle, the acoustic impedance at a specific location is calculated as the ratio between in-coming and the reflected energy. Vertical Seismic Profiling is a technique whereby reflection from the subsurface are recorded on down-hole geophones from wave fields generated by a surface source.

Most processing of seismic data is based on the a priori knowledge of the signature of the seismic wave generated by the source. In recent years, significant progress has been made in the use of seismic interferometry to enable subsurface imaging with signals previously considered as noise. This is typically achieved by a process in which new seismic responses corresponding to "virtual sources or receivers" are constructed by cross-correlating seismic observations made on a closed surface surrounding the object investigated. As is commonly done for most imaging based on seismic data, approximations allow use of incomplete spatial coverage. For examples, see: Schuster, G. T., 2001, Theory of Daylight/Interferometric Imaging-Tutorial: $63^{rd}$ Meeting, EAGE, Expanded Abstracts, Session: A-32; Wapenaar, K., Draganov, D., Thorbecke, J., and Fokkema, J., 2002, Theory of acoustic daylight imaging revisited: 72nd Ann. Internat. Mtg., Soc. Expl. Geophys., Extended Abstracts, 2269-2272; and Curtis, A., Gerstoft, P., Sato, H., Snieder, R., and Wapenaar, K., 2006, Seismic interferometry, turning noise into signal: The Leading Edge, 25, no. 9, 1082-1092.

More recently, Brandsberg-Dahl, S., Xiao, X., and Hornby, B., 2007, Surface Seismic Imaging with VSP Green's Functions, paper H012, 69th Mtg.: Eur. Assn. Geosci. Eng., London, 2007 (hereinafter referred to as "Brandsberg-Dahl, et al."), proposes getting closer to a self-contained, data-driven process for turning acoustic data into images. The authors suggest correlating Walk-away VSP data into surface-seismic data provided the VSP and surface-seismic data are acquired using a similar aperture. With the borehole seismic data acquired all the way to the surface, this gives a migration that is independent of explicit determination of velocities. However the correlation-based technique may not generate satisfactory resolution in many applications.

One commonly used source with extended time signature is the Seismic Vibrator, a low-impact, low-amplitude, typically hydraulic, source programmed to generate a signal within a user-defined frequency range. The source signature has a duration of typically around 10-20 s, during which time the frequency of the driving signal continuously changes from a minimum value, typically 8 Hz, to a maximum value, typically around 100 Hz. One characteristic of a Seismic Vibrator is that its response is non-linear, such that the vibrator, in addition to the acoustic signal at the intended frequency, generates energy at higher harmonics at two, three, or even higher multiples of this frequency. A problem arises when the recordings of the surface and down-hole receivers are correlated with a reference signal not describing or improperly describing the harmonic energy, the harmonic energy representing an out-of-time occurrence of the higher frequencies will be misplaced, resulting in data containing not-properly-accounted-for energy at higher frequencies at nearly all times, eventually limiting the useful bandwidth of the data.

SUMMARY

According to embodiments, a method for processing surface seismic data is provided. The method includes receiving surface seismic data representing seismic signals detected at a plurality of surface locations, and estimating from borehole seismic data, travel times of direct wave arrivals between a surface seismic source and one or more locations in a borehole. The surface seismic data is wavefield deconvolved based at least in part on the estimated travel times of direct wave arrivals.

According to some embodiments, wavefield energy is estimated from the surface seismic data and the wavefield deconvolution is based at least in part on a combination of the estimated wavefield energy and the estimated direct travel times.

According to other embodiments, a related system and article of manufacture are also provided.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

Figure 1A:
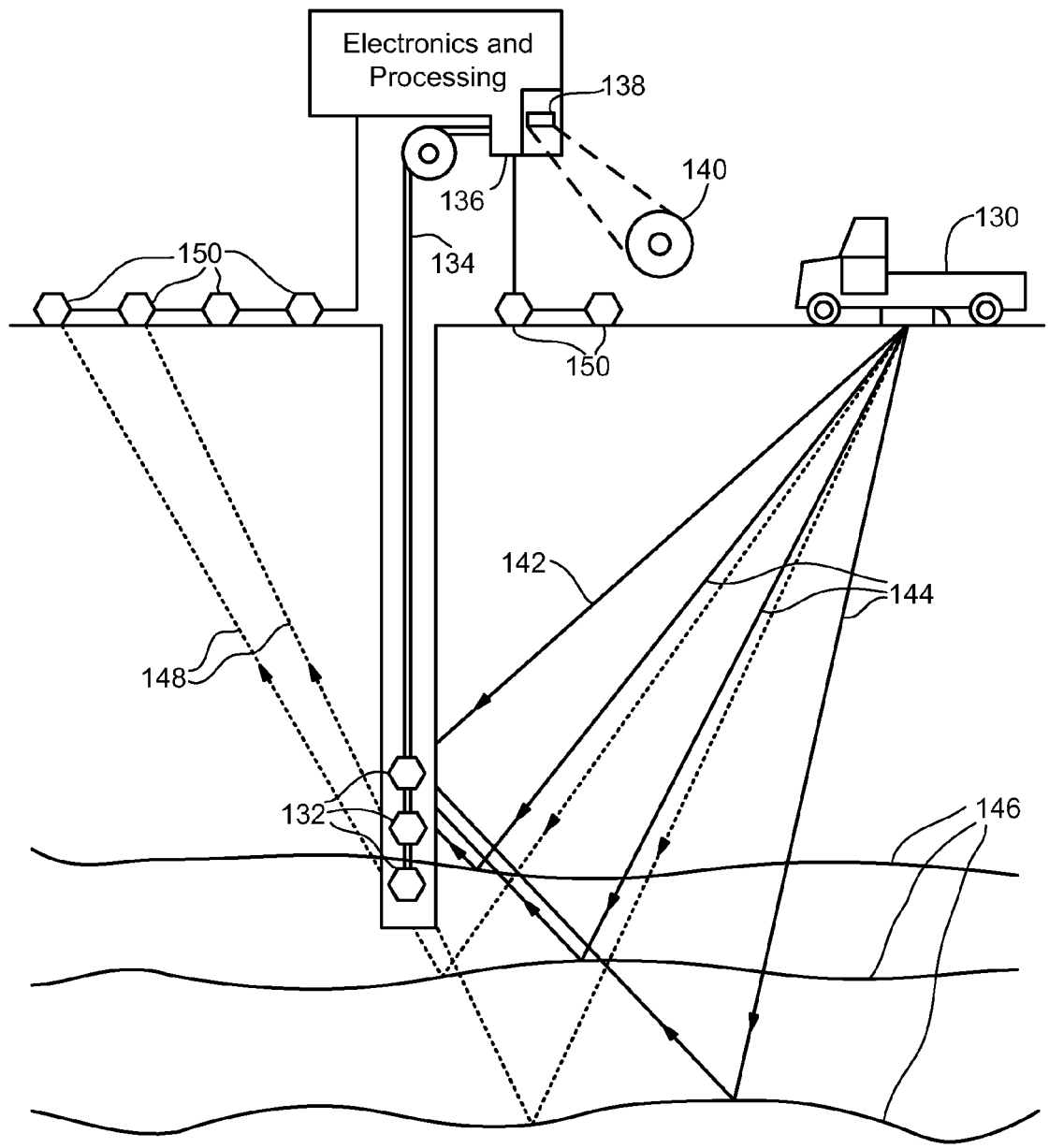
FIG. 1a shows equipment associated with acquiring seismic data in accordance with some embodiments.

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

According to some embodiments, techniques for using data recorded in the well by the VSP geophones to properly condition surface-recorded data such that the bandwidth (and therefore the resolution) of the surface-recorded data is improved. According to some embodiments, this is done within the deconvolution framework described in U.S. Patent Application Publication No. US2005/0122840, incorporated herein by reference, in which a maximum bandwidth can be recovered from VSP data by using data that has not been corrupted by correlation with and wrong or incomplete source signature.

Brandsberg-Dahl, et al., addresses the issue of combining Walk-away VSP and surface-seismic data. They write the image I(x) of the subsurface at location x as:

$$I(x) = \iiint_{S \times R \times \Omega} G(x, x_s, \omega) G^*(x_r, x, \omega) D(x_r, x_s, \omega) dx_s dx_r d\omega \quad [1]$$

where $G(x_1, x_2, \omega)$ is the Green's function, propagating the wavefield from location $x_1$ to location $x_2$, $D(x_r, x_s, \omega)$ is the data recorded with the source at $x_s$ and receiver at $x_r$, and the integral is taken over all receivers, sources and frequencies. For a subsurface that is laterally invariant or smoothly varying, using a combined VSP and surface-seismic dataset, in the expression for the image derived from the surface-seismic data, they replace both the Green's functions, one by the VSP data recorded within the image space at location x, with the source at $x_s$, the other by the VSP data recorded within the image space at location x, with the source at $x_r$. Doing this gives the expression:

$$I(x) = \iiint_{S \times R \times \Omega} D^{VSP*}(x, x_s, \omega) D^{VSP*}(x_r, x, \omega) D^{SS}(x_r, x_s, \omega) dx_s dx_r d\omega \quad [2]$$

We distinguish between two cases: 1) The source signature is known a priori; and 2) No information about the source signature is available. Under certain assumptions, we can extract an a priori unknown source signature from recorded data combining VSP and surface-seismics. An extension is provided to surface-seismic data of the deconvolution process described in Haldorsen, J. B. U., Miller, D. E., and Walsh, J., *Walk-away VSP using drill noise as a source*, Geophysics, 60, 978-997 (1995), incorporated herein by reference, for reverse VSP data generated by a working drill bit.

Embodiments described herein have several advantages over those proposed in Brandsberg-Dahl, et al., including one or more of the following: (1) the source is represented by its correct amplitude spectrum; (2) the source signature combined with the earth transmission response through the overburden is explicitly determined; and (3) the techniques allow the use of the measured radiated signal, which potentially can give a significantly wider bandwidth of the data and therefore a higher-resolution image.

According to some embodiments, the following processing sequence is provided:

(1) Find the direct arrival times to each of the VSP receivers from each of the source settings. For a non-impulsive source, this may involve correlating the recorded VSP traces with an initial guess of the source signature, or deconvolving the VSP traces with a near-field measurement of the initially transmitted source field. For imaging using the compressional waves, one may also have to separate the VSP data into compressional, shear and different borehole modes. Simplistically this can be done by separating the wavefield into components parallel to and perpendicular to the ray path of the direct wave, this may be done more appropriately by using parametric wavefield decomposition as has been previously described. For example, see: Esmersoy, C., *Velocity estimation from Offset VSPs using direct P and converted SV waves:* 58th Ann. Internat. Mtg., Soc. Expl. Geophys., Extended Abstracts, 538-541 (1988); Leaney, W. S. and Esmersoy, C., *Parametric inversion of offset VSP wavefields:* 59th Ann. Internat. Mtg., Soc. Expl. Geophys., Extended Abstracts, 26-29 (1989); and Leaney, W. S., *Parametric wavefield decomposition and application,* 60th Ann. Internat. Mtg., Soc. Expl. Geophys., Extended Abstracts, 1097-1100 (1990), each of which is incorporated by reference herein. In the following, we will assume that a wavefield separation has been done and use $D_c^{vsp}$ to denote the compressional components obtained from the VSP data.

(2) Estimate the energy and the "source signature" from the Walk-away VSP traces (all levels, all shots)

$$\hat{f}(\omega) = \frac{1}{N_{vsp}} \sum_s \sum_x |x - x_s| D_c^{vsp}(x, x_s, \omega) e^{-i\omega t(x,x_s)} \quad [3]$$

$$\hat{E}_{vsp}(\omega) = \frac{1}{N_{vsp}} \sum_s \sum_x |x - x_s| |D^{vsp}(x, x_s, \omega)|^2$$

(3) Form a "semblance-weighted signature deconvolution operator" $F(\omega)$ $$F(\omega) = \frac{\hat{f}^*(\omega)}{\hat{E}_{vsp}(\omega)} \quad [4]$$

(4) Filter (deconvolve) the source signature $S(\omega)$, and surface-recorded seismic data $D^{SS}(x,x_s,x_r,\omega)$ by F (5) Filter the migrated surface data to get the Earth Response at x by $\Phi$.

(6) Time-correct and stack the filtered surface data (this is part of the "migration")

$\Phi(\omega) = F(\omega) S(\omega)$ $D_F^{SS}(x,x_s,x_r,\omega) = F(\omega) D^{SS}(x,x_s,x_r,\omega) \quad [5]$ $D_{F\Phi}^{SS}(x,x_s,x_r,\omega) = \Phi(\omega) D_F^{SS}(x,x_s,x_r,\omega) \quad [6]$ $$I_{mig}^{ss}(x, \omega) = \quad [7]$$
$$\frac{1}{N_{vsp}} \sum_s \sum_r |x - x_s| |x - x_r| D_{F\Phi}^{ss}(x, x_s, x_r, \omega) e^{-i\omega[t(x,x_s)+t(x,x_r)]}$$

(7) The final image is obtained by stacking the real-part of $I_{mig}(x,\omega)$ (applying the "imaging condition").

$$E(x; t=0) \approx \sum_\omega \text{Re}(I_{mig}^{ss}(x, \omega)) \quad [8]$$

Steps (6) and (7) above constitute a simplified representation of "migration", the details of which are discussed in Miller, D. E, Oristaglio, M., and Beylkin, G., *A new slant on seismic imaging: Migration and integral geometry*: Geophysics, 52, 943-964 (1987), incorporated by reference herein, including specifications of weights to use in the migration sums in order to correct for variations in energy flux density over the aperture of the image, due to the acquisition geometry or otherwise.

For the signature-deconvolution step in Equation [4], according to some embodiments, rather than the straight inverse of the estimated "source signature", the "semblance-weighted inverse" as shown by Haldorsen, J. B. U., Miller, D. E., and Walsh, J., *Multichannel Wiener deconvolution of vertical seismic profiles*; Geophysics, 59, 1500-1511 (1994), incorporated by reference herein, is used for increased stability and to recover an optimum signal bandwidth for a focused Walk-away VSP. One may note that this operator is no longer optimal when applied to the surface-seismic data, and that it is not guaranteed that the filter will yield acceptable results when applied to the "surface noise" $N^{SS}$. For example, see FIGS. 16-17. According to some other embodiments, the average energy from the surface-seismic is used, replacing the average energy from the Walk-away VSP data in the operator described by Equation [4]. This inverse filter would be stable but possibly not recover a maximum bandwidth. For example, see FIGS. 18-19.

The filter $\Phi(\omega)$ is the inverse of the transmission function through the overburden ($\Phi(\omega) = \langle g(x,x_s,\omega)\rangle^{-1}$) and its purpose is to remove this transmission function from the image. When applied, this filter also corrects for attenuation in the overburden. However, the filter requires knowledge of the source signature. When no such information is available, the filtering can be omitted by simply setting $\Phi(\omega) = 1$.

It is important to note that this procedure assumes that the surface-seismics and the VSP data have been acquired using geometries that are sufficiently similar to warrant the assumption that they sample the same overburden transmission function. In this case, according to some embodiments, an arbitrary signature is removed and the average transmission function is partially removed from the surface seismics. While the greatest accuracy will be generally observed very close to the well, it has been found that in cases where the average transmission function changes sufficiently slowly away from the well bore, the amplitude corrections given above can also be applied away from the well.

Advantageously, the described embodiments can be used to estimate and remove wavefield distortions, originating either in the seismic source itself, or in the transmission through the overburden down to a horizon of interest.

FIG. 1*a* shows equipment associated with acquiring seismic data in accordance with some embodiments. In FIG. 1*a*, a seismic vibrator 130 is deployed on the earth's surface and a plurality of seismic receivers 132 are deployed downhole in a wellbore. The seismic receivers may, for instance, be part of a wireline tool, such as Schlumberger's Versatile Seismic Imager tool, which has up to forty 3-component seismic receivers. The seismic receivers may be connected to surface electronics equipment 136 by a wireline cable 134. According to some embodiments, the receivers could be part of a seismic-while-drilling service such as Schlumberger's seismicVISION, which has four seismic receivers. The surface electronics equipment will typically contain recording hardware that will record the seismic data obtained by the seismic receivers. The surface electronics equipment may also contain a computer processor to process the received data and such a computer processor will typically have a media reader, such as CD drive 138, for reading computer software instructions from a software storage device, such as CD 140. The computer software may allow the computer processor to process the received seismic data and produce a high-frequency geological subsurface image in accordance with the inventive methodology taught herein. It will be understood that various parts of the data processing operations may be performed downhole, performed at the wellsite, or performed away from the wellsite. Also shown in FIG. 1*a* is an array of surface seismic receivers 150 that are connected via cables to surface electronics equipment 136.

In operation, the seismic vibrator 130 produces a series of seismic signals, some of which pass directly through the geologic subsurface and are received by the seismic receivers 132, such as direct arrival 142, and some of which are reflected by geologic interfaces 146 (where differing geologic strata on opposing sides of the interfaces have contrasting acoustic impedances), such as reflected arrivals 144.

Additionally, some of the seismic signals are reflected by geologic interfaces 146 toward surface seismic receivers 150, such as reflected arrivals 148.

After the borehole seismic receivers 132 obtain one series of measurements, the wireline tool (and its associated seismic receivers 132) are repositioned in the wellbore. The seismic vibrator 130 is maintained in the same position and programmed with the same reference sweep and the recording process is repeated. The term "array of seismic receiver locations" as used herein means a series of locations that allow the upgoing and downgoing wavefields to be separated from seismic data received by borehole seismic receivers positioned at these locations. While a single physical borehole seismic receiver may be used, seismic data must be obtained from an array of borehole seismic receiver locations to allow this separation to take place. In a typical operating environment, the array of borehole seismic receiver locations will consist of a series of at least 5 different locations. The data from the surface seismic receivers and borehole seismic receives need not be recorded at the same time or from the same vibrator source position. However, since significant variability can occur in the coupling of the vibrator source to the earth surface, according to some embodiments it is preferred for increased accuracy to record both the surface seismic data and the borehole seismic data while the vibrator source is in the same position.

Figure 1B:
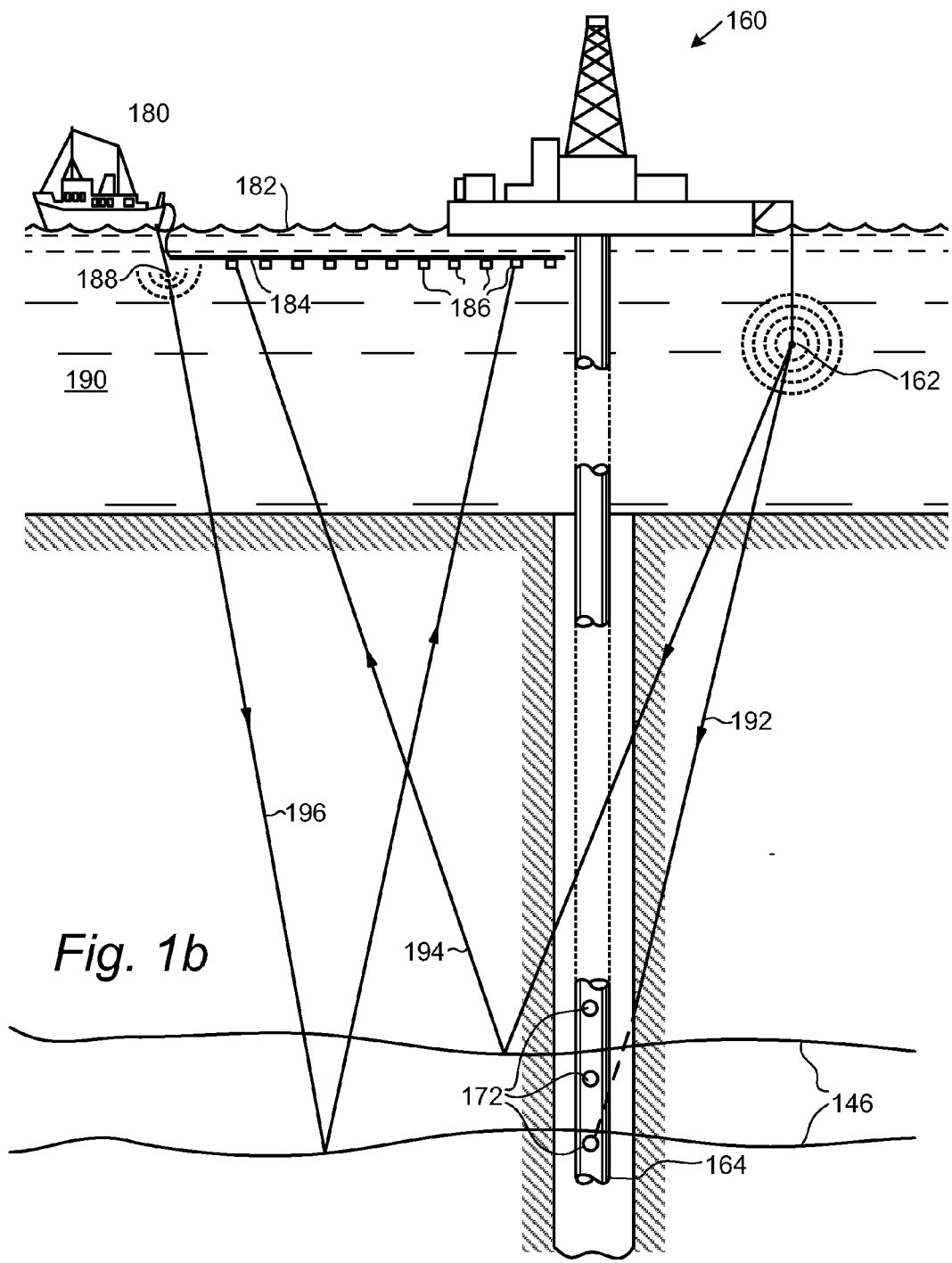
FIG. 1b shows equipment associated with acquiring seismic data in a marine environment in accordance with some embodiments.

FIG. 1b shows equipment associated with acquiring seismic data in a marine environment in accordance with some embodiments. In FIG. 1b, a seismic source 162, such as an airgun, is deployed on in the sea 190 and a plurality of seismic receivers 172 are deployed downhole in a wellbore. The seismic receivers may, for instance, be part of a wireline tool, such as Schlumberger's Versatile Seismic Imager tool, which has up to forty, 3-component seismic receivers, or the seismic receivers could be part of a seismic-while-drilling operation, such as Schlumberger's seismicVISION service which has 4-component seismic receivers. In some cases while-drilling tools only have a single receiver. Where only a single position is recorded, up-down separation may still be achieved using 4-component borehole seismic receivers. The seismic receivers may be in communication with surface electronics in rig 160 via a wireline cable, or in the case of drillstring deployed receivers, via mudpulse telemetry or a wired drillpipe. The downhole tool 164 can also include a seismic source 170. Also shown is a seismic vessel 180 which deploys a plurality of towed streamers 184 each of which including a plurality of hydrophones 186. Seismic vessel 180 also has one or more seismic sources 188, such as airguns. According to some embodiments, the seismic vessel deploys an ocean bottom cable which includes a plurality of multi-component seismic receivers on the sea bottom.

The surface electronics equipment in rig 160 and/or on seismic vessel 180 will typically contain recording hardware that will record the seismic data obtained by the seismic receivers. The surface electronics equipment may also contain a computer processor to process the received data and such a computer processor will typically have a media reader, such as CD drive, for reading computer software instructions from a software storage device, such as a CD. The computer software may allow the computer processor to process the received seismic data and produce a high-frequency geological subsurface image in accordance with the inventive methodology taught herein.

In operation, the seismic sources 162 and 188 produces one or more seismic signals, which pass directly through the geologic subsurface and are received by the seismic receivers 172, such as direct arrival 192, and some of which are reflected by geologic interfaces 146 (where differing geologic strata on opposing sides of the interfaces have contrasting acoustic impedances), such as reflected arrivals 194 and 196. As described with respect to FIG. 1a, after the borehole seismic receivers obtain one series of measurements, the tool can be repositioned in the wellbore to obtain data from additional borehole locations. Since the repeatability of marine seismic sources such as airguns is very high, and the transmission of the signal generated by a marine seismic source to the body of water in which the source is immersed is practically invariant, the recordings by the surface seismic receivers and the borehole seismic receivers may be done at different times. According to some embodiments, the data from the surface seismic receivers in the towed streamers is recorded at different times than the borehole seismic receivers. For example, if the borehole seismic data is recorded while drilling, the surface streamers can recorded day, months or years later. To improve accuracy, it is preferred that a source with similar source signature and positioning be used during such later recordings.

A description will now be provided wherein the techniques are applied to a synthetic elastic dataset that combines uncorrelated, simultaneous VSP and Surface-seismic data, generated using a model with a ratio of compressional to shear velocities set to 2. A random perturbation was imposed in the shallow layers. The dataset comprises simultaneous walkaway VSP and Surface-seismic data using a 2D source line. An 11-level VSP tool was located in a vertical well at 48-ft intervals at depths 1900-2380 ft. The shot-points were extending at 16-ft interval along a straight line 2000 ft to either side of the well head.

Figure 2:
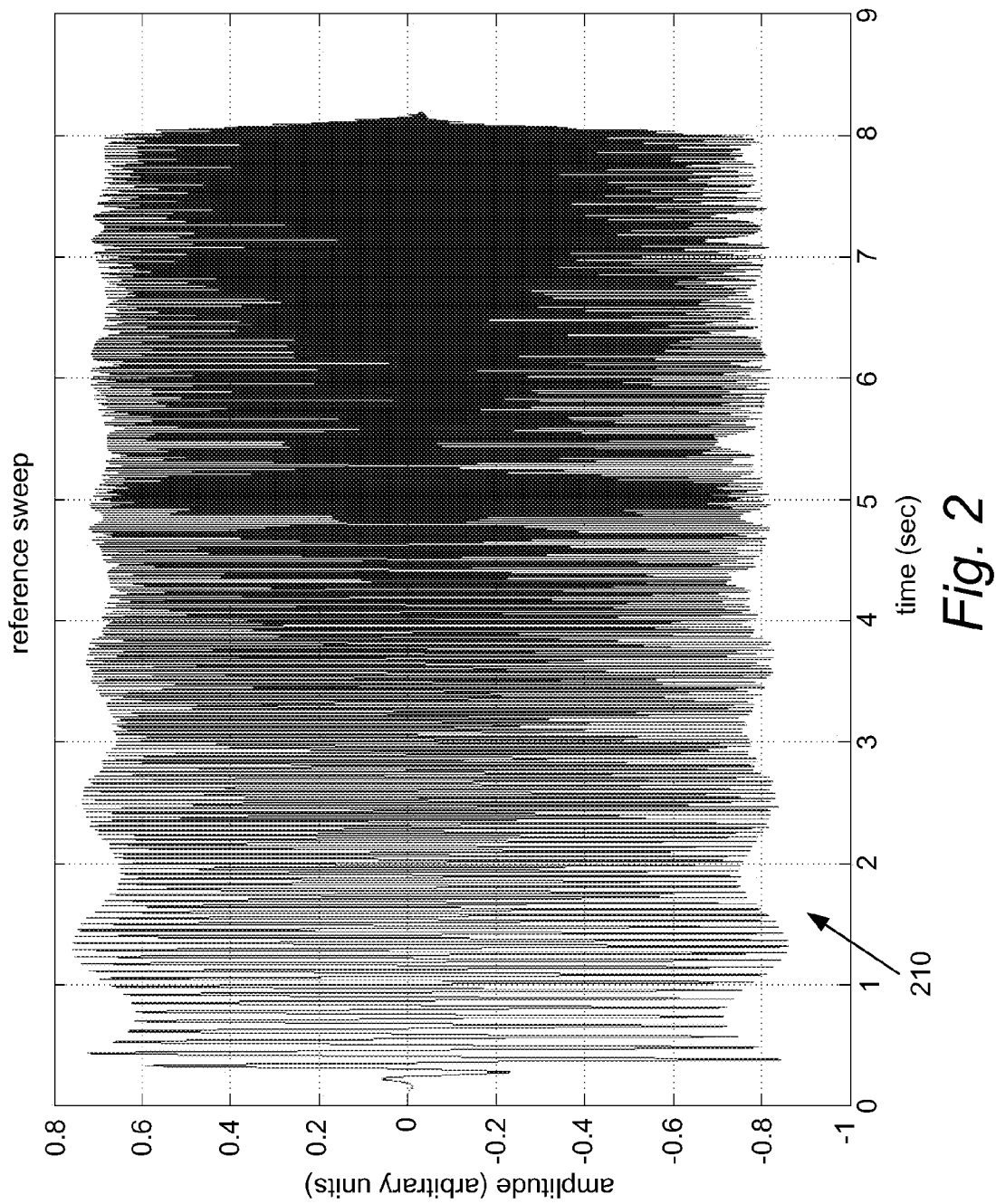
FIG. 2 is a plot showing the source signature used, according to some embodiments.
Figure 3:
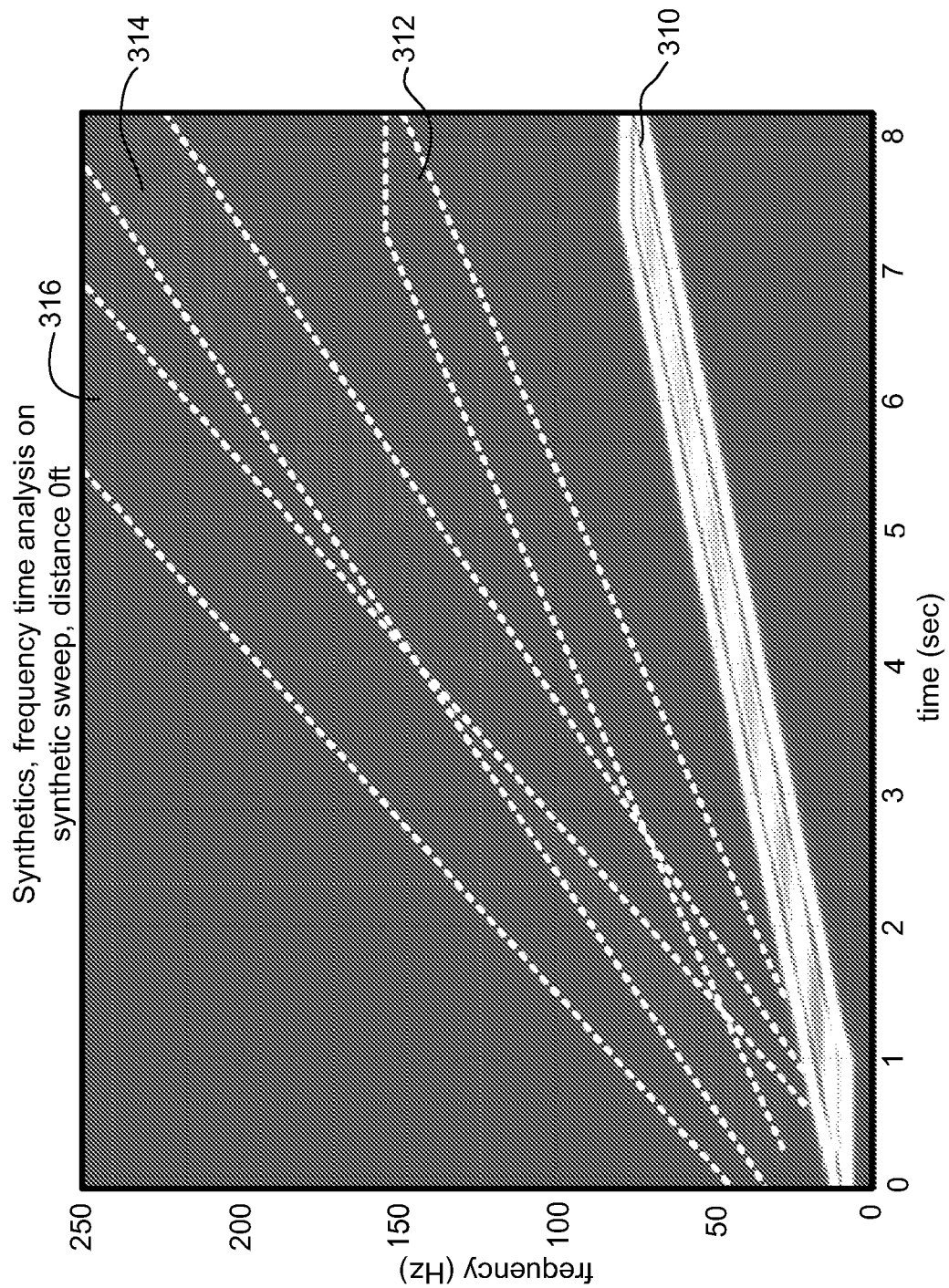
FIG. 3 is time frequency analysis showing the spectral properties of the source signature used.

FIG. 2 is a plot showing the source signature used, according to some embodiments. The source signature 210 has a sweep with a fundamental (by definition the $1^{st}$ harmonic) rising linearly from 8 to 80 Hz, and with a slight distortion responsible for the $2^{nd}$ and $3^{rd}$ harmonics rising linearly with twice and three times the slope of the fundamentals. The duration of the signal was 8.2 s with 200 ms taper on either end. About 10% white noise has been added to the synthetic elastic data. FIG. 3 is time frequency analysis showing the spectral properties of the source signature used. A Fourier transform in a short, sliding window was used. Fundamental or (by definition) first harmonic 310 is shown as a bright shape, while the second harmonic 312, third harmonic 314, and fourth harmonic 316 are dimmer and outlined by white broken lines.

13-second long Walk-away VSP records were generated with the seismic source moving along an about 4000 ft long line centered on the well. An interval of 16 ft was used both for the source settings and for the receivers. The receiver line extended 2000 ft, symmetrically to either side of the well head, using vertical geophones only.

Figure 4A:
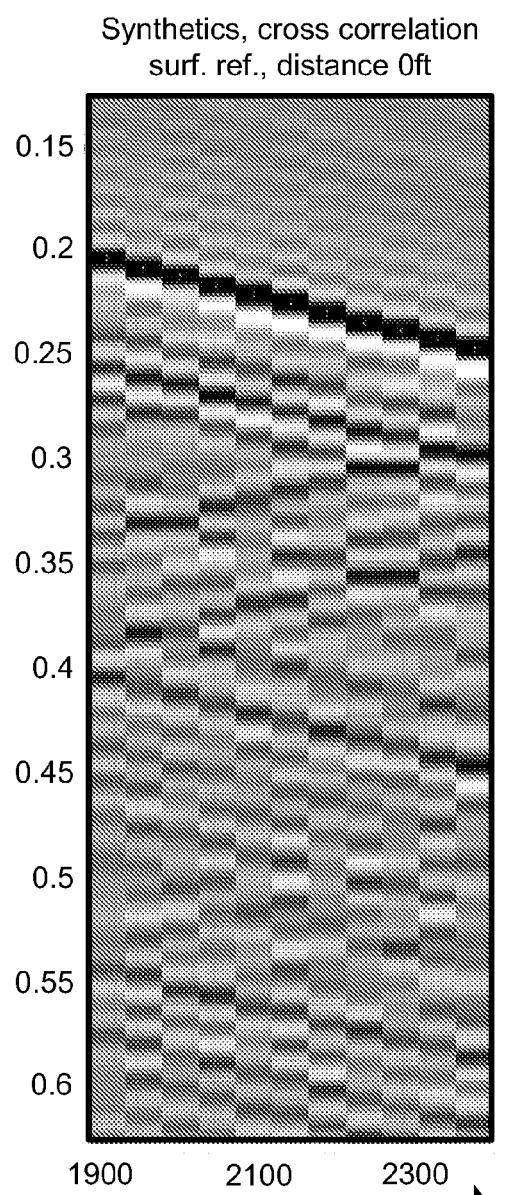
FIGS. 4a-b show examples of the synthetic data used.
Figure 4B:
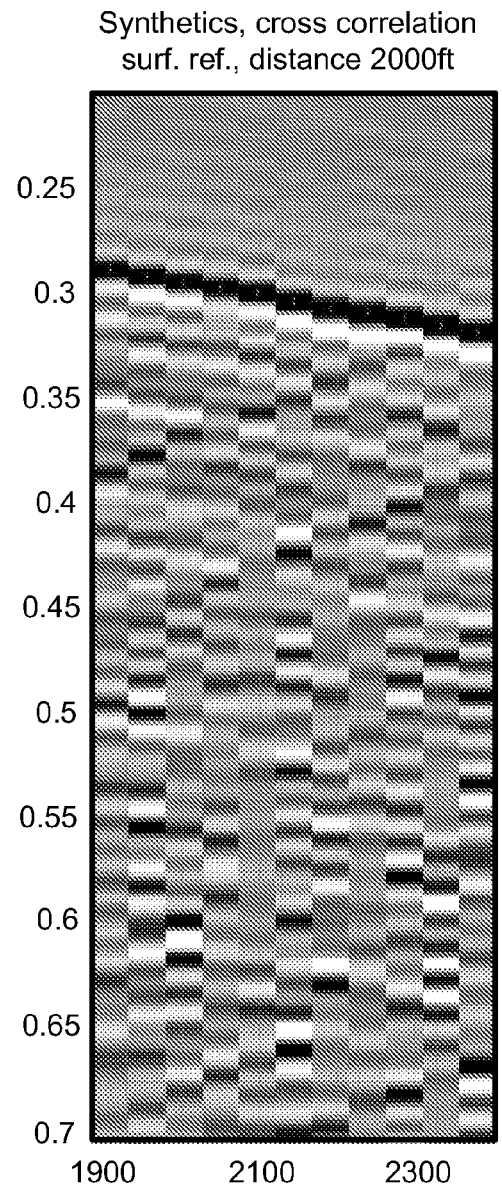

FIGS. 4a-b show examples of the synthetic data used. For the two different source offsets (0 and 2000 ft), 0.5 seconds of data, after the raw data first had been correlated with the pilot sweep. The compressional fields are displayed after correlating the raw data with the (in this case, known) pilot sweep, then rotating the two-component correlated wavefield to give maximum amplitude around the direct compressional arrival pointing along the ray path of the incoming compressional. In particular, FIGS. 4a-b show the component of the VSP data after rotating the xyz components to give maximum-amplitude around the direct compressional arrival. Irrespective of the arrival angle, this would point along the incoming compressional. FIG. 4a shows the rotated (compressional) wavefield 410 generated by a source at the well head. FIG. 4b shows the corresponding field 412 generated by a source offset by 2000 ft from the well head.

Figure 5A:
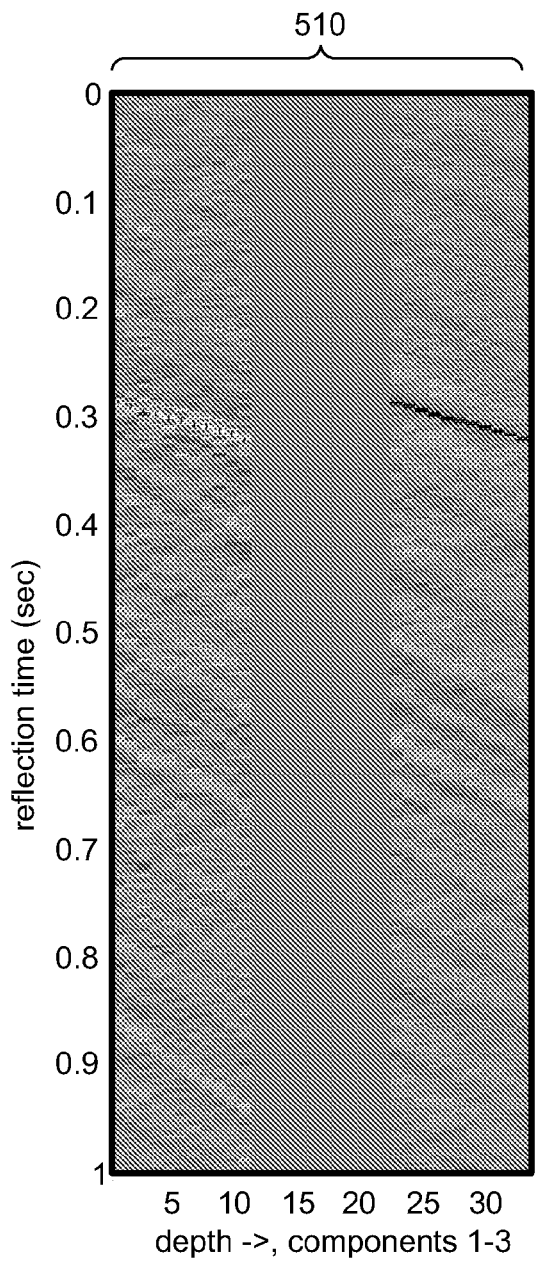
FIGS. 5a-b show deconvolved traces after applying the inverse filter to the in-line, cross-line and vertical components of the raw VSP data.
Figure 5B:
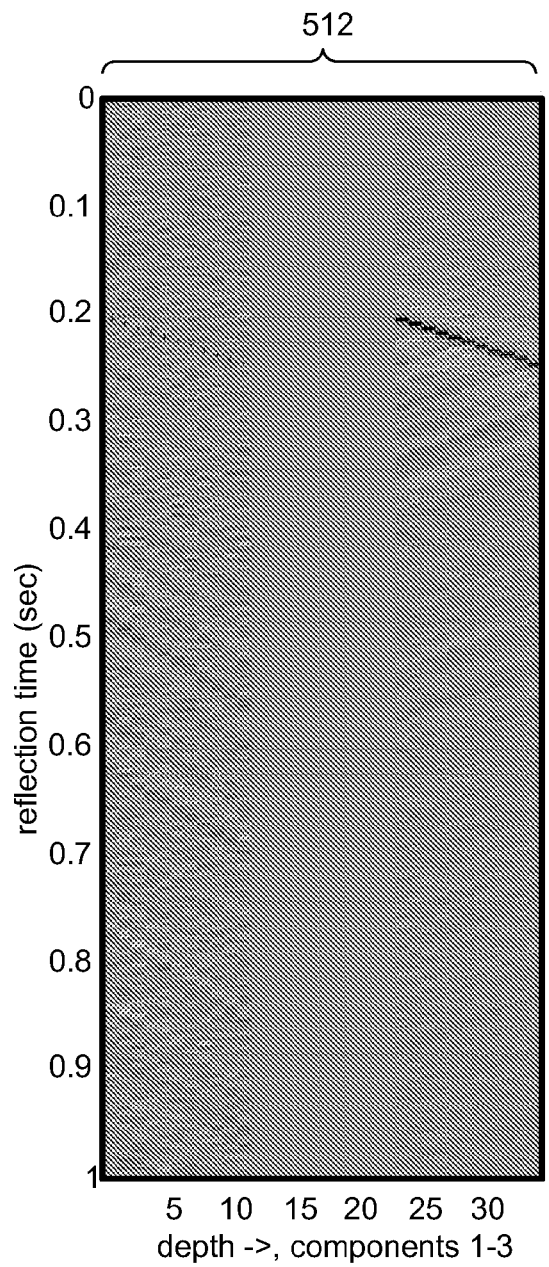

FIGS. 5a-b show deconvolved traces after applying the inverse filter to the in-line, cross-line and vertical components of the raw VSP data. Plots 510 and 512 show the in-line, cross-line (all zeros) and vertical deconvolved components for the data shown in FIGS. 4a-b, after deconvolution using Equation [4]. At zero offset, shown in FIG. 5a, the compressional energy, mostly parallel to the direct arrivals, appears to be mostly on the vertical components, with the down-going shear on the in-line components presumably originating as conversions near the shallow perturbations. At 2000 ft offset, shown in FIG. 5b, the vertical and in-line horizontal components contain similar amounts of energy, both dominated by converted shear.

In the synthetic data, the most significant reflectors are at 0.39 s and 0.55 s two-way-time, just above the shallowest and below the deepest down-hole receivers. In addition there is a structure at around 0.44 s, within the aperture of the array. The deconvolution should effectively remove the multiples generated by energy trapped between top of these layers and any of the two reflectors. The deconvolution has only limited effect on multiples generated within the array aperture, and no effect on any multiples generated below the deepest VSP receiver.

At each of the 251 settings of the surface source, a direct compressional "effective source" signature is estimated using essentially the inner sum (over x) in Equation [3], performing a vertical focusing of the direct compressional field.

Figure 6:
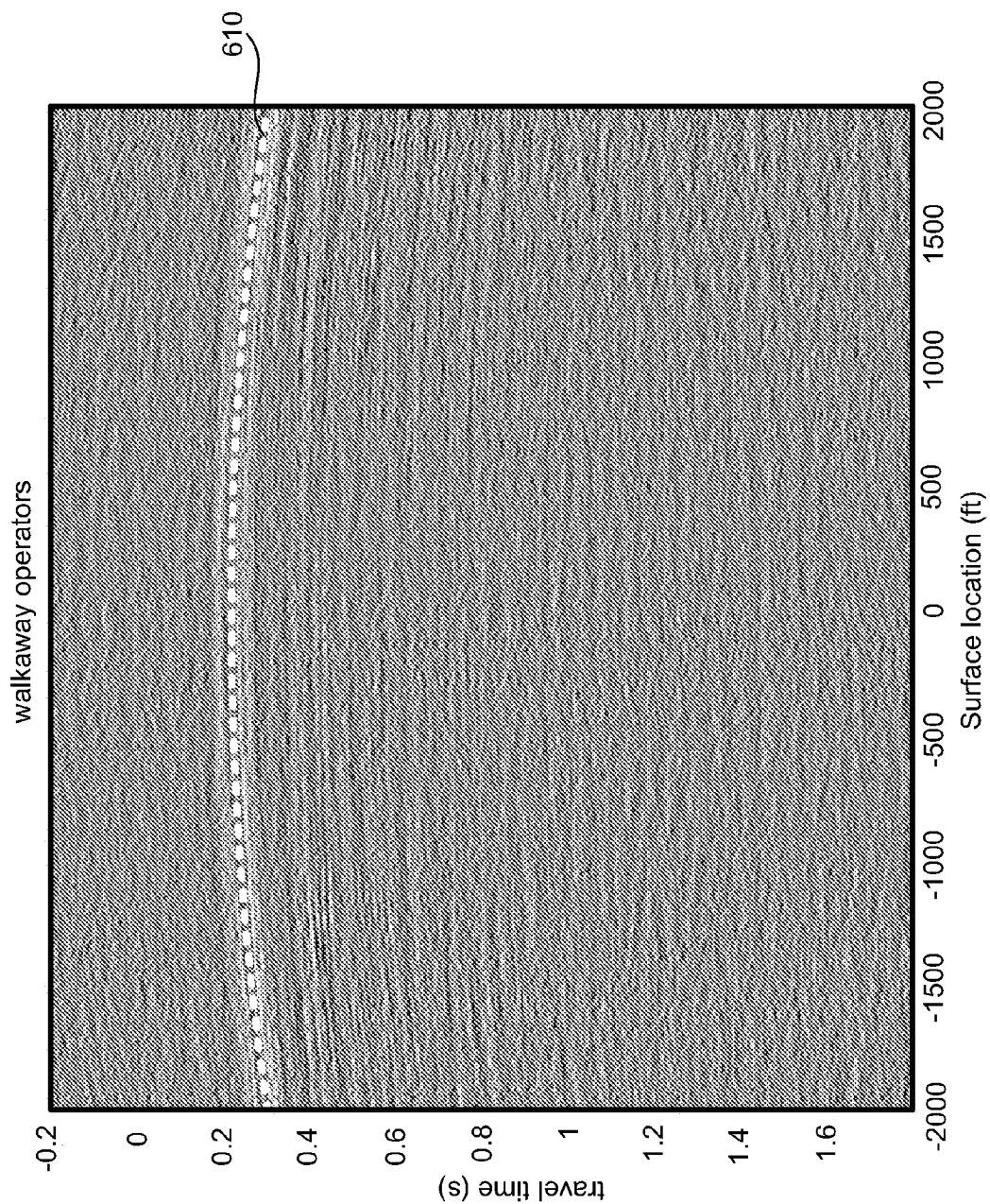
FIG. 6 shows the down-going wavefield extracted from the data recorded by the down-hole receivers for each of the individual source settings after correlating with the true source sweep signal.

FIG. 6 shows the down-going wavefield extracted from the data recorded by the down-hole receivers for each of the individual source settings—after correlating with the true source sweep signal. The dashed line 610 indicates the travel times for the direct wave from the source to the receivers. The source aperture extends about 2 kft to either side of the well head. The traces displayed in FIG. 6 were obtained by, for each individual source setting, extracting the direct compressional wavefield, performing the inner summation (over x) of this wavefield using Equation [3], shifting in time by the median transit time for the down-hole array and the specific source setting, and finally a correlating with the source signal. These traces are used to find the travel times $t(x,x_s)$ for the direct wave from the source to the receiver array which again allows us to complete the focusing in Equation [3] by summing over $x_s$.

Figure 7:
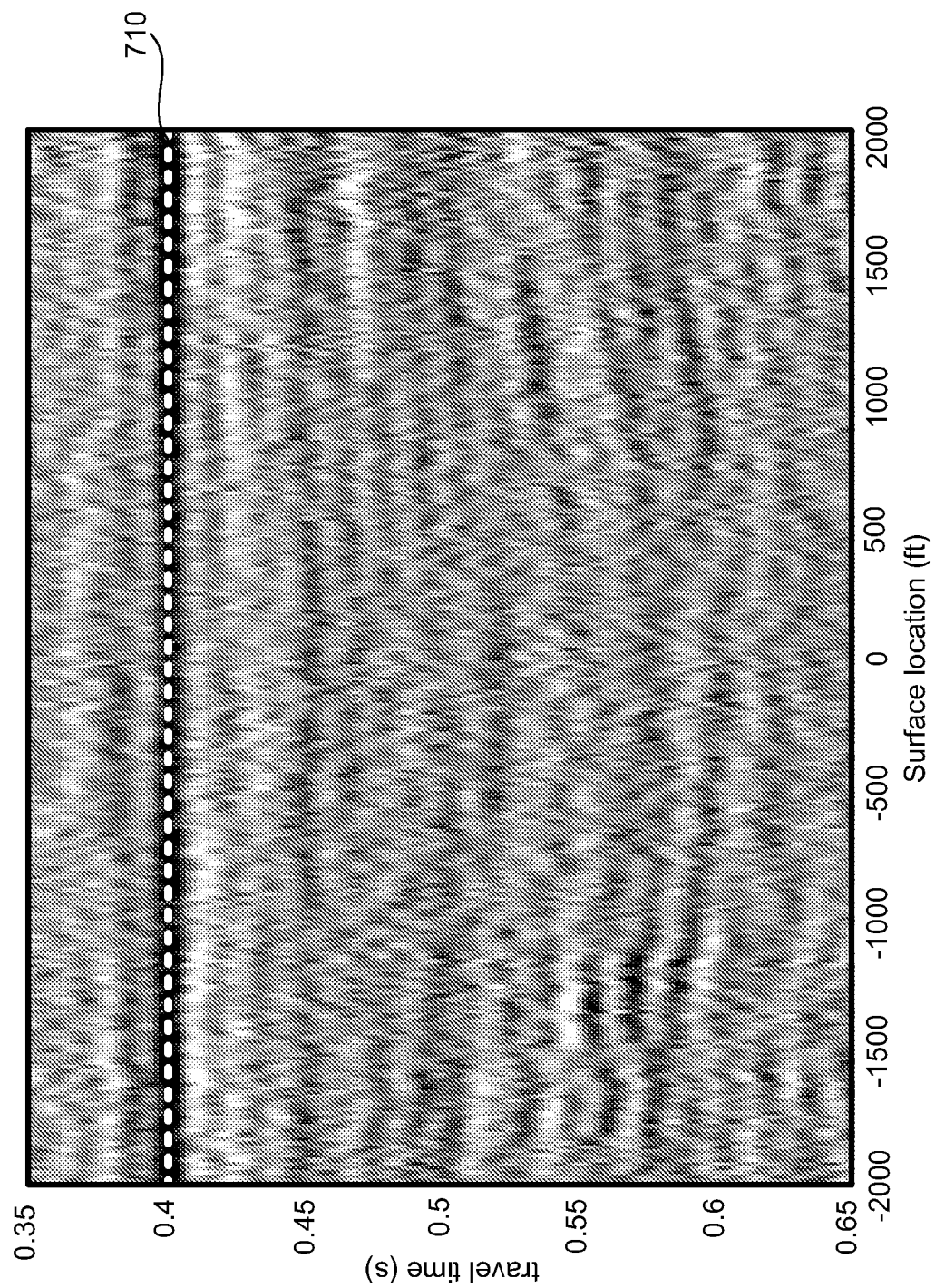
FIG. 7 shows a plot of the data from FIG. 6 have been aligned at around 0.4 seconds.

As described, the dashed line 610 indicates the travel times related to the individual source settings. In FIG. 7, the data from FIG. 6 have been aligned at around 0.4 seconds. The down-going wavefield at the depth of around 2000 ft, is correlated with the reference sweep and arbitrarily aligned at about 0.4 seconds, as indicated by the dashed line 710. The traces shown in FIG. 7 are obtained by correlating the source function $S(\omega)$ with the acoustic field travelling downwards past the well-bore receiver array. The downward travelling wavefield can be expressed as the source function convolved with a function, $g(x,x_s,\omega)$ describing the transmission through the overburden from the source located at $x_s$, to the receivers located at x. Thus, the correlated and aligned traces are approximately measuring $|S(\omega)|^2 g(x,x_s,\omega)$ (the autocorrelation of the source signature convolved with the transmission functions) and the figure indicates that the transmission functions $g(x,x_s,\omega)$ include multiple reflections. Whereas some of the structures we see in $g(x,x_s,\omega)$ may be generated near the source, others may be related to multiples generated between strong reflectors in the overburden. However, without additional information it is difficult to determine where along the raypath from the source to the down-hole receivers the observed multiples are picked up.

Figure 8:
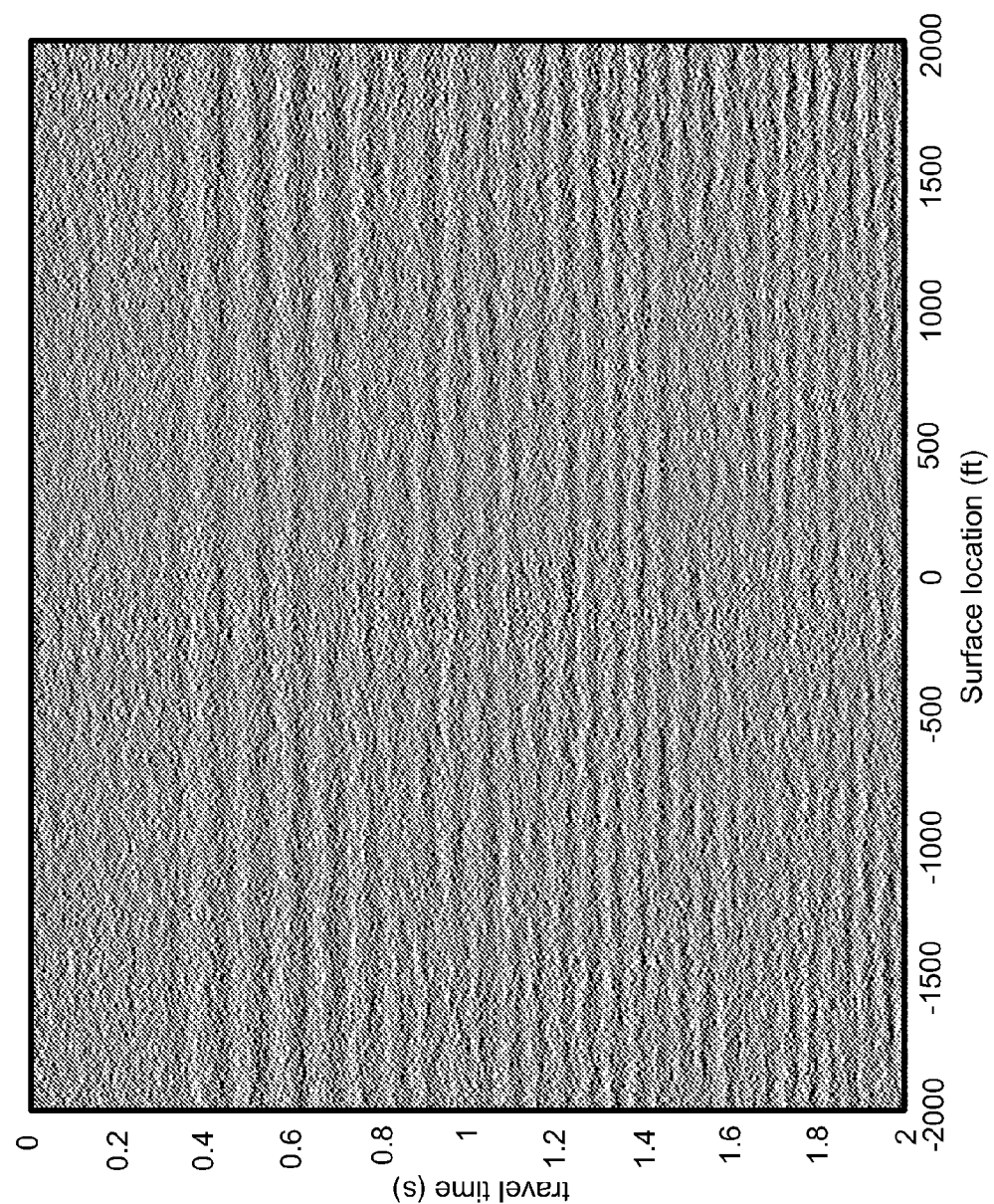
FIG. 8 shows a plot representing the aligned raw, uncorrelated down-going wavefield.

FIG. 8 shows a plot representing the aligned raw, uncorrelated down-going wavefield. The aligned down-going wavefields 810 are shown at the level of the VSP receiver array. These wavefields represent the transfer functions from the source locations on the surface to the depth of the receivers (at around 2000 ft), convolved with the source signature $S(\omega)$.

Figures 9A, 9B:
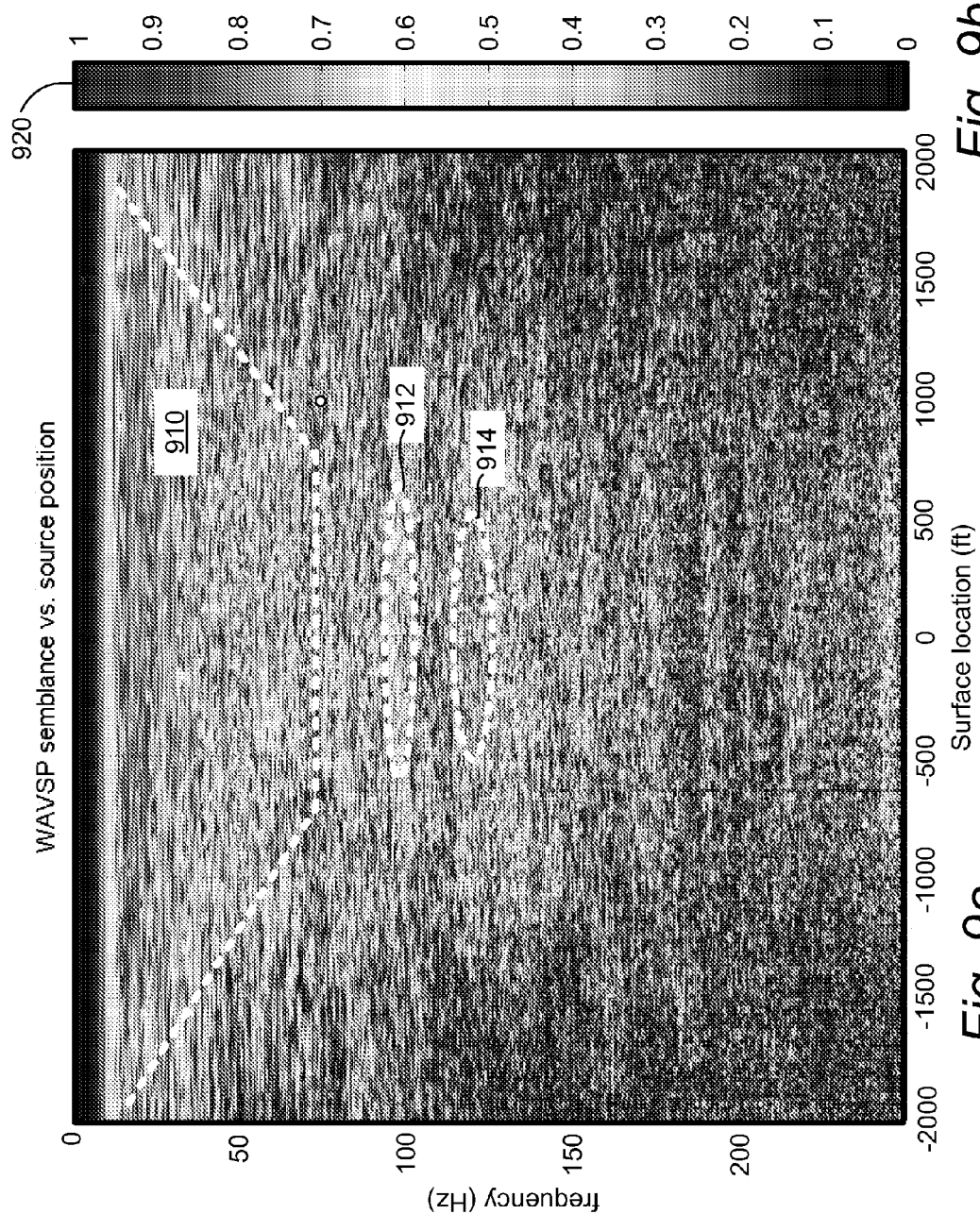
FIGS. 9a-b show a plot representing the semblance spectra associated with the estimation of these "down-going" waveforms from the Walk-away VSP data.

FIGS. 9a-b show a plot 910 representing the semblance spectra associated with the estimation of these "down-going" waveforms from the Walk-away VSP data. Semblance spectra were obtained from the about 4000 ft long walk-away line using the 8-80 Hz distorted linear 8-s sweep. The vertical axis of FIG. 9a gives the frequency; the horizontal axis of FIG. 9a shows the distance of the source from the well head. The down-hole tool is located below the 0 ft mark. FIG. 9b shows a legend 920 indicating the semblance values used in FIG. 9a. The darker shades near the top of legend 920 indicate semblance values higher than 0.75 and the shades near the bottom of legend 920 indicate semblance values less than 0.35. On FIG. 9a, areas with relatively high semblance are shown in the dashed line areas 910, 912 and 914.

Figure 10:
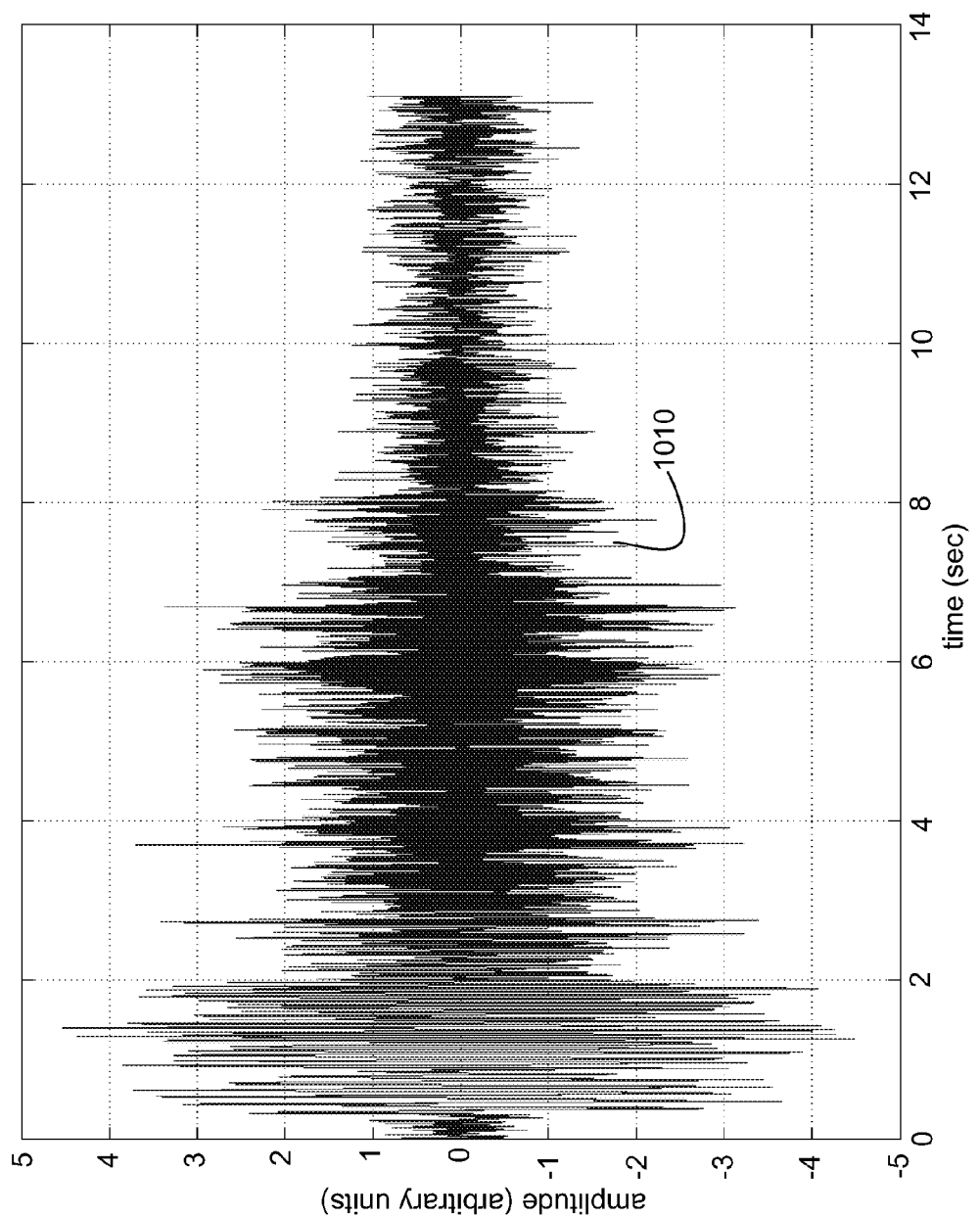
FIG. 10 is a plot showing a signal f(ω) formed by stacking the aligned waveforms shown in FIG. 8.

Note that the 10% white noise added to the synthetic data is clearly visible in the waveforms such as wavefields 810 shown in FIG. 8. With measurements of $S(\omega)g(x,x_s,\omega)$, such as in FIG. 8, it is very difficult to find both $S(\omega)$ and $g(x,x_s,\omega)$. As discussed, these aligned waveforms are the wavefield $|x-x_s|D^{vsp}(x,x_s,\omega)e^{-i\omega t(x,x_s)}$ in Equation [3]. FIG. 10 is a plot showing a signal $f(\omega)$ formed by stacking the aligned waveforms shown in FIG. 8. Plot 1010 represents a convolution of the average transfer function from the surface to the depth of the receivers (at around 2000 ft), convolved with the radiated source signature $S(\omega)$. From this stack we can find the inverse operator $F(\omega)$ (using Equation [4]) to apply to the surface seismic data as well as to the source signature $S(\omega)$ (Equation [5]).

Figure 11:
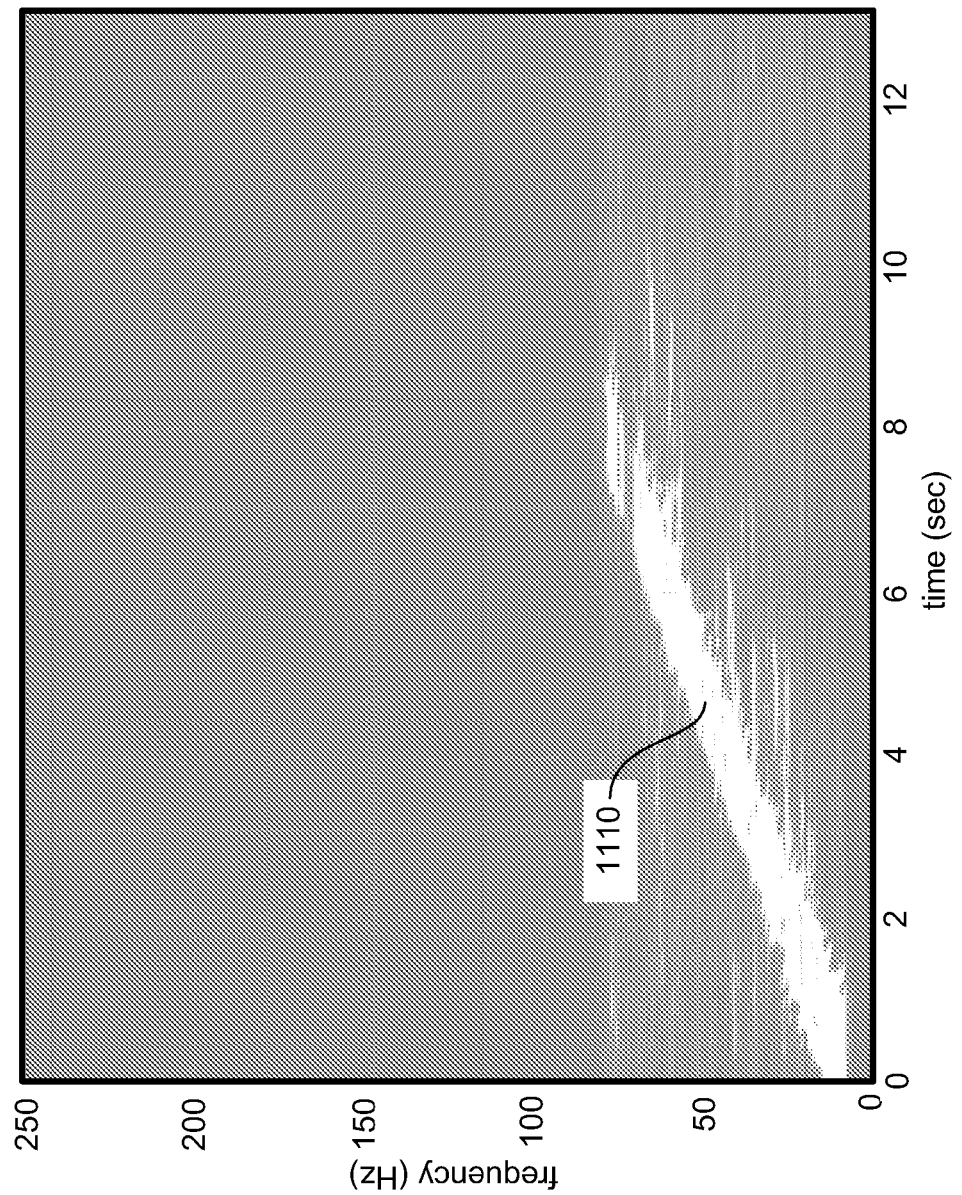
FIG. 11 shows the amplitude spectra of the source signature shown in FIG. 10, analyzed using a one-second sliding time window.

FIG. 11 shows the amplitude spectra of the source signature 1010 shown in FIG. 10, analyzed using a one-second sliding time window. The spectra represent a convolution of the average transfer function from the surface to the depth of the receivers (at around 2000 ft), convolved with the radiated source signature $S(\omega)$. The intended signal is contained in the heavy, linearly rising line 1110 from 8 to 80 Hz. There is very little evidence of any higher harmonics. The display shows no clear patterns associated with harmonic distortion (this is because they do not exceed the added white noise). The techniques described in U.S. Patent Application Publication No. US2005/0122840, incorporated herein by reference, teach how to use the estimated "effective source signature", a signal containing significant distortion above the high end of the fundamentals of their source sweep to extend the useful bandwidth for VSP data by about 70%. From FIG. 11 we see that energy above 80 Hz can be recovered for smaller-offsets subsets of the Walk-away VSP data. Also, with the very minor distortion imposed on the source, it is likely that there is not enough energy in the $2^{nd}$ harmonics over the 10% random noise added to the data to significantly extend the bandwidth. However, less noise within the primary signal band below 80 Hz is beneficial, and therefore higher-fidelity data can be obtained by correctly placing the distorted harmonic energy at lower frequencies.

Figure 12:
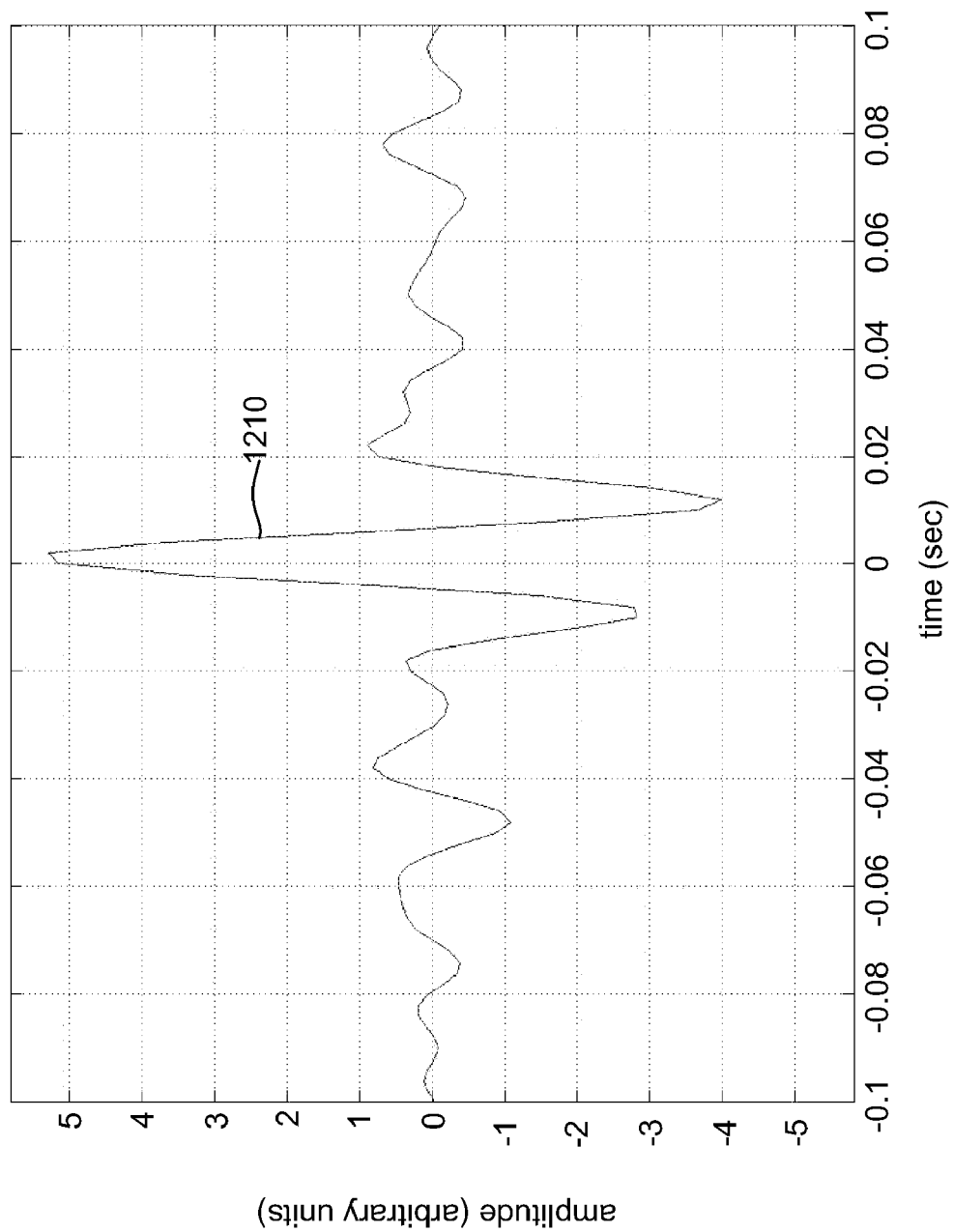
FIG. 12 is plot showing the inverse filter Φ(t) used for removing the average transmission response through the overburden down to the reservoir.

FIG. 12 is plot showing the inverse filter $\Phi(t)$ used for removing the average transmission response through the overburden down to the reservoir (as in Equation [5]). This filter 1210 should be correlated with the data after deconvolution using the VSP derived signal. The event leading the main spike by about 45 ms, represent a short-period multiple seen in FIG. 7 at around 0.45 sec.

FIGS. 13-19 compare the effects of different deconvolution operators applied to the surface-seismic data. FIGS. 13-19 also clearly demonstrate that a significant part of the noise in surface-seismic data related to surface waves may not correlate very strongly with the signal propagating deep into the formation.

Although the operators estimated for each of the individual source setting could be applied directly to uncorrelated surface-recorded data, it has been found that this is unstable in many applications. In the following descriptions, we will apply the seven-point processing flow outlined above, including isolating the direct compressional wavefield and establishing all the transit times from the Walk-away VSP, then focus the recorded Walk-away traces to establish one single "effective source signature" for the entire survey, and deconvolve this "effective signature" out of the surface-recorded data using one single deconvolution operator. Several ways of formulating this inverse are also compared.

The results are exemplified using only one of the source settings, with the vibrator located at 2000 ft offset, just at the edge of the receiver line.

In correlating with the true sweep, the presence of harmonic energy is acknowledged. As usual with surface-receiver data, these are dominated by air-coupled Rayleigh waves cutting across the array at a speed of about 2700 ft/s. Originating along the primary surface wave, scattered waves at the same speed but opposite propagation direction are also noticeable. These scattered surface waves are generated by the inhomogeneities in the shallow part of the model.

Figure 13:
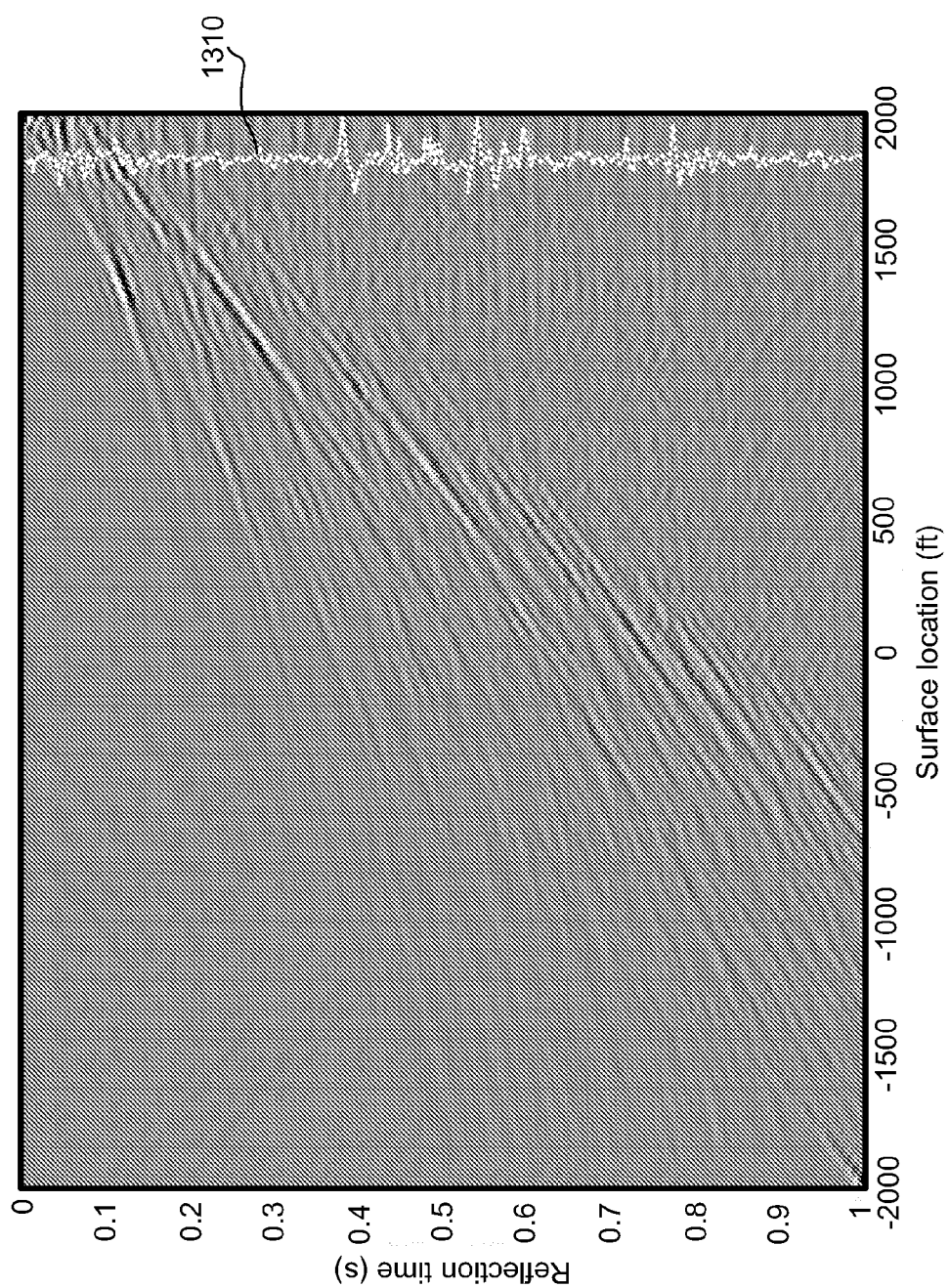
FIG. 13 shows an example of the surface-seismic traces having an fk filter applied.

FIG. 13 shows an example of the surface-seismic traces having an fk filter applied. The traces in plot 1310 were acquired with the vibrator located at 2000 ft offset, just off the right-hand edge of the receiver line. The data have been correlated with the true reference sweep, and an fk-filter applied. Dashed line 1310 represents the synthetic multiple-free trace derived from the model. To better see the details of the reflected field, an fk filter has been applied to eliminate linear events moving to the left or to the right across the array slower than 4 kft/s. We will consider the section in FIG. 13 to be the benchmark section in our discussions below.

One should note the differences between the "synthetic" trace 1310 and the correlated surface-receiver data, in that the surface-receiver data show a strong presence of a multiple with a period of around 0.05 s. Also, at around 0.2 s there appears to be a strong reflection in the surface-receiver data where there is no significant impedance contrast. Conceivably, this could be either a multiple or be related to shear converted in the randomized shallow part of the model. With the $v_p/v_s$ ratio of 2 used, if it is a shear generated at the source, this would correspond to the compressional reflection seen at 0.1 seconds. If this is a compressional multiple, we should look for the deconvolution operators applied next to eliminate, or at least attenuate this.

Figure 14:
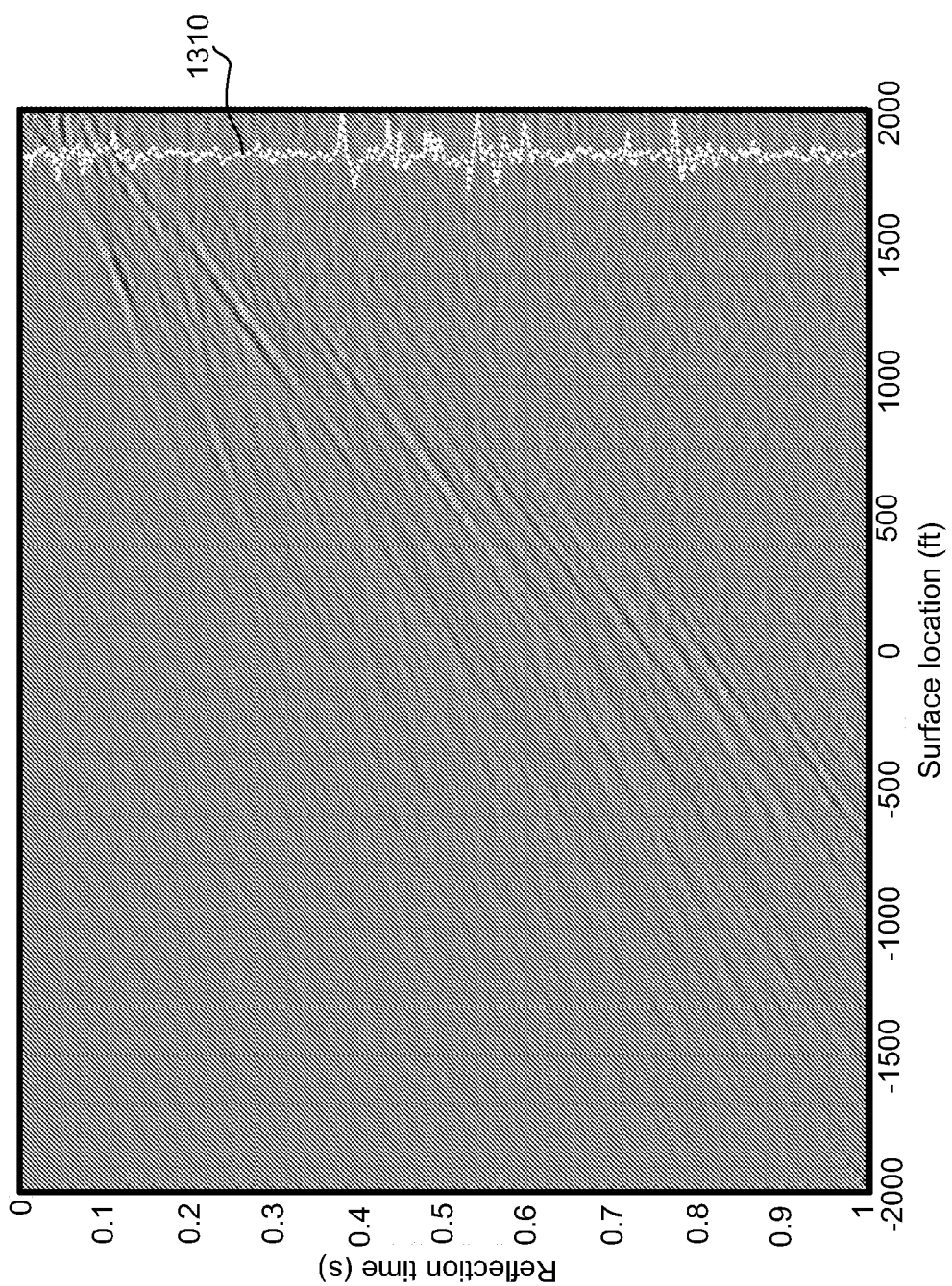
FIG. 14 shows an example of fk-filtered surface-seismic traces that have been deconvolved using signature deconvolution with 10% white noise.

A signature deconvolution using the extracted source signature has been performed. As regarding the amplitudes of the source signature, this would be different than as described in Brandsberg-Dahl, et al. which teaches applying a correlation process which results in the source represented by its power spectrum. FIG. 14 shows an example of fk-filtered surface-seismic traces that have been deconvolved using signature deconvolution with 10% white noise. The data was acquired with the vibrator located at 2000 ft offset, just off the right-hand edge of the receiver line. The data have been deconvolved using signature deconvolution with 10% white noise to stabilize the inverse, and based on the source signature shown in FIG. 10, estimated from the Walk-away VSP. One interesting but not surprising feature of the traces of FIG. 14 is that the surface waves appear to be somewhat less well correlated to the down-hole signal than what is the case for the reflections. This is an unstable process, highly dependent upon which mechanism is used to regularize the inverse operator. The inverse displayed in FIG. 14 are stabilized assuming 10% white noise.

Figure 15:
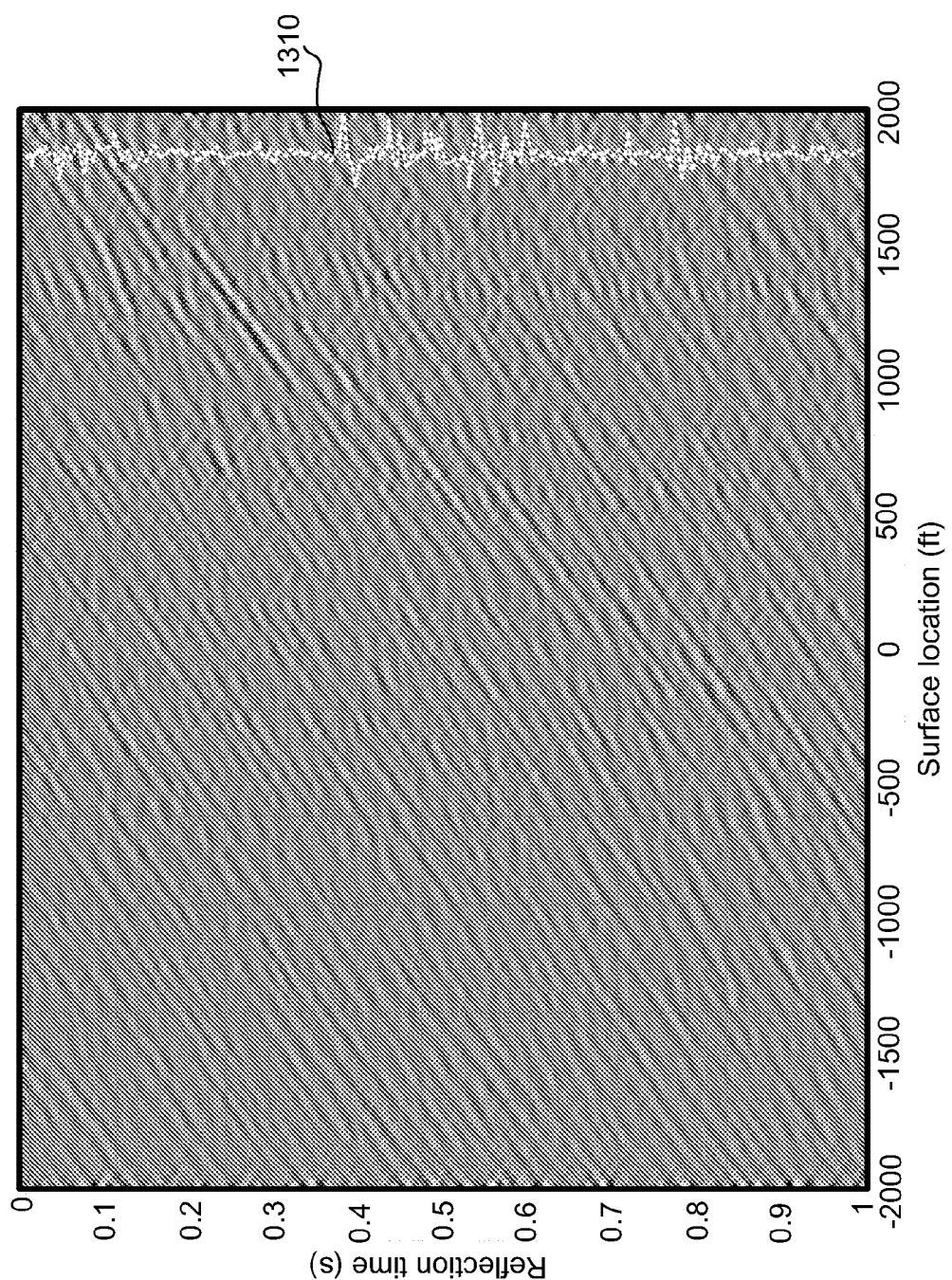
FIG. 15 is an example of fk-filtered surface-seismic traces deconvolved using signature deconvolution with 10% white noise and having an attenuating filter applied.

FIG. 15 is an example of fk-filtered surface-seismic traces deconvolved using signature deconvolution with 10% white noise and having an attenuating filter applied. The traces were acquired with the vibrator located at 2000 ft offset, just off the right-hand edge of the receiver line. The data have been deconvolved using signature deconvolution with 10% white noise to stabilize the inverse, and based on the source signature shown in FIG. 10, estimated from the Walk-away VSP. Following this, the average transmission response has been attenuated using a filter calculated from the Walk-away VSP and the synthetic sweep. The synthetic multiple-free trace 1310 drived from the model is also shown.

Figure 16:
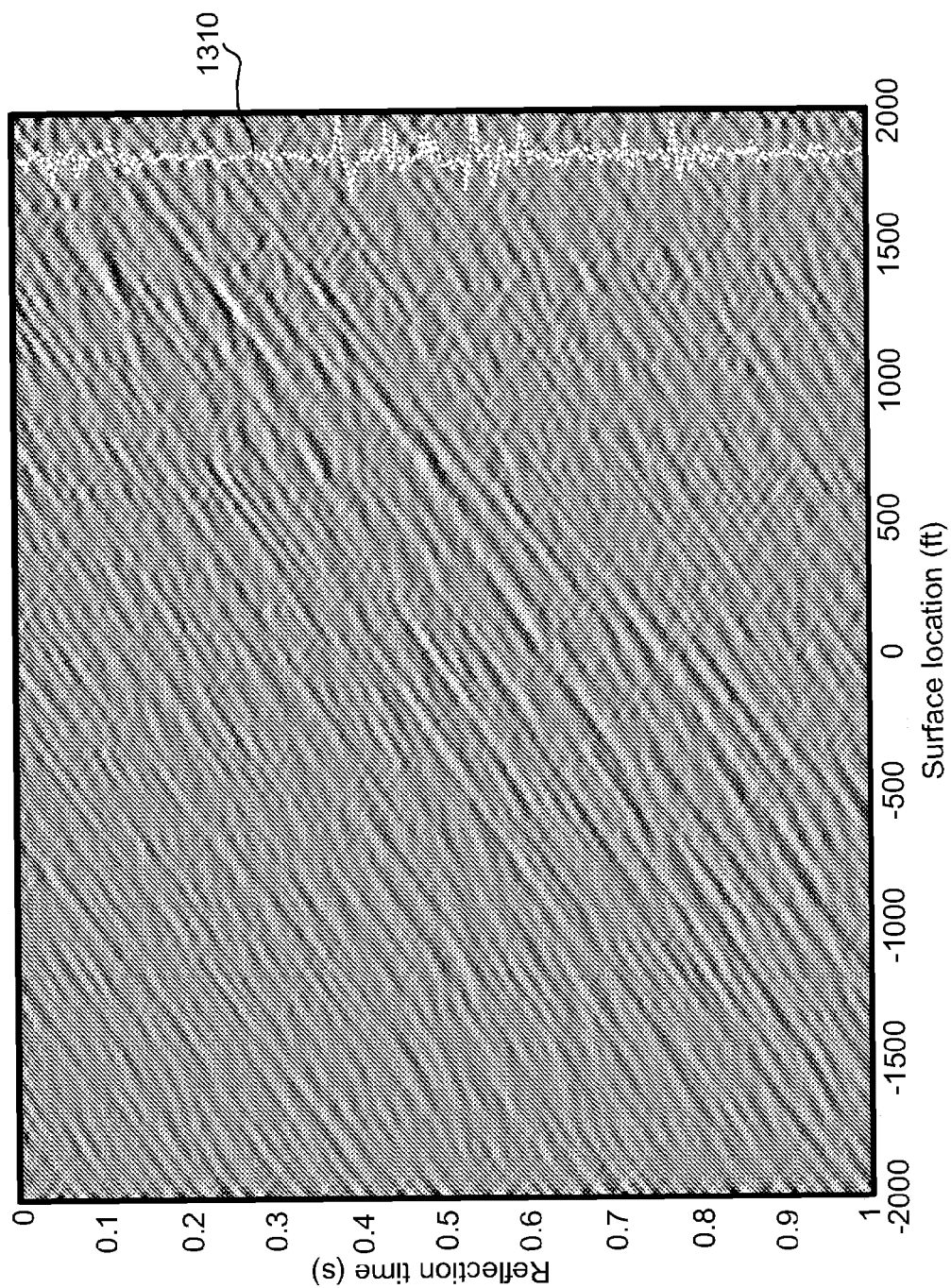
FIG. 16 shows an example of fk-filtered surface-seismic traces that have deconvolved using a semblance-weighted deconvolution operator based on VSP data.

FIG. 16 shows an example of fk-filtered surface-seismic traces that have deconvolved using a semblance-weighted deconvolution operator based on VSP data. The traces were acquired with the vibrator located just off the right-hand edge of the receiver line. The data have been deconvolved using a semblance-weighted deconvolution operator based on the source signature shown in FIG. 10, estimated from the Walk-away VSP. The synthetic multiple-free trace 1310 derived from the model is also shown. The semblance-weighted deconvolution, was applied using Equation [4]. Due to the different noise environments seen by the VSP receivers and the surface-mounted receivers, we cannot expect an operator designed to minimize the noise on the VSP data, to be effective in reducing the noise on the surface-recorded data. The effect of these operators on noise not represented in the VSP data will be unpredictable, at best. For this particular source setting, the operation seems to be doing only moderately well.

Figure 17:
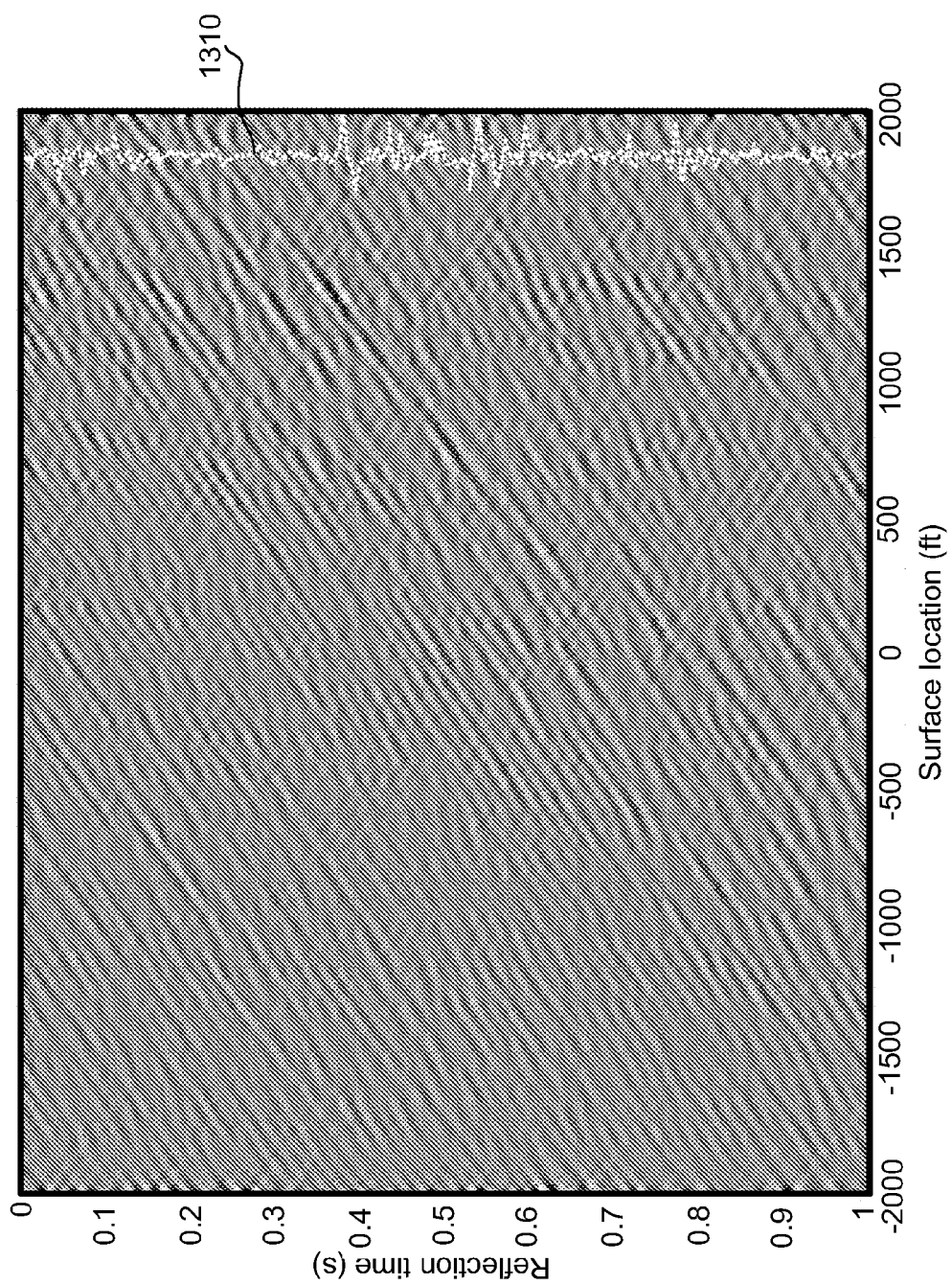
FIG. 17 shows an example of fk-filtered and attenuated surface-seismic traces that have deconvolved using a semblance-weighted deconvolution operator.

FIG. 17 shows an example of fk-filtered and attenuated surface-seismic traces that have deconvolved using a semblance-weighted deconvolution operator. Following the steps described with respect to FIG. 16, the average transmission response was attenuated using a filter calculated from the Walk-away VSP and the synthetic sweep, as described with respect to FIG. 15.

Figure 18:
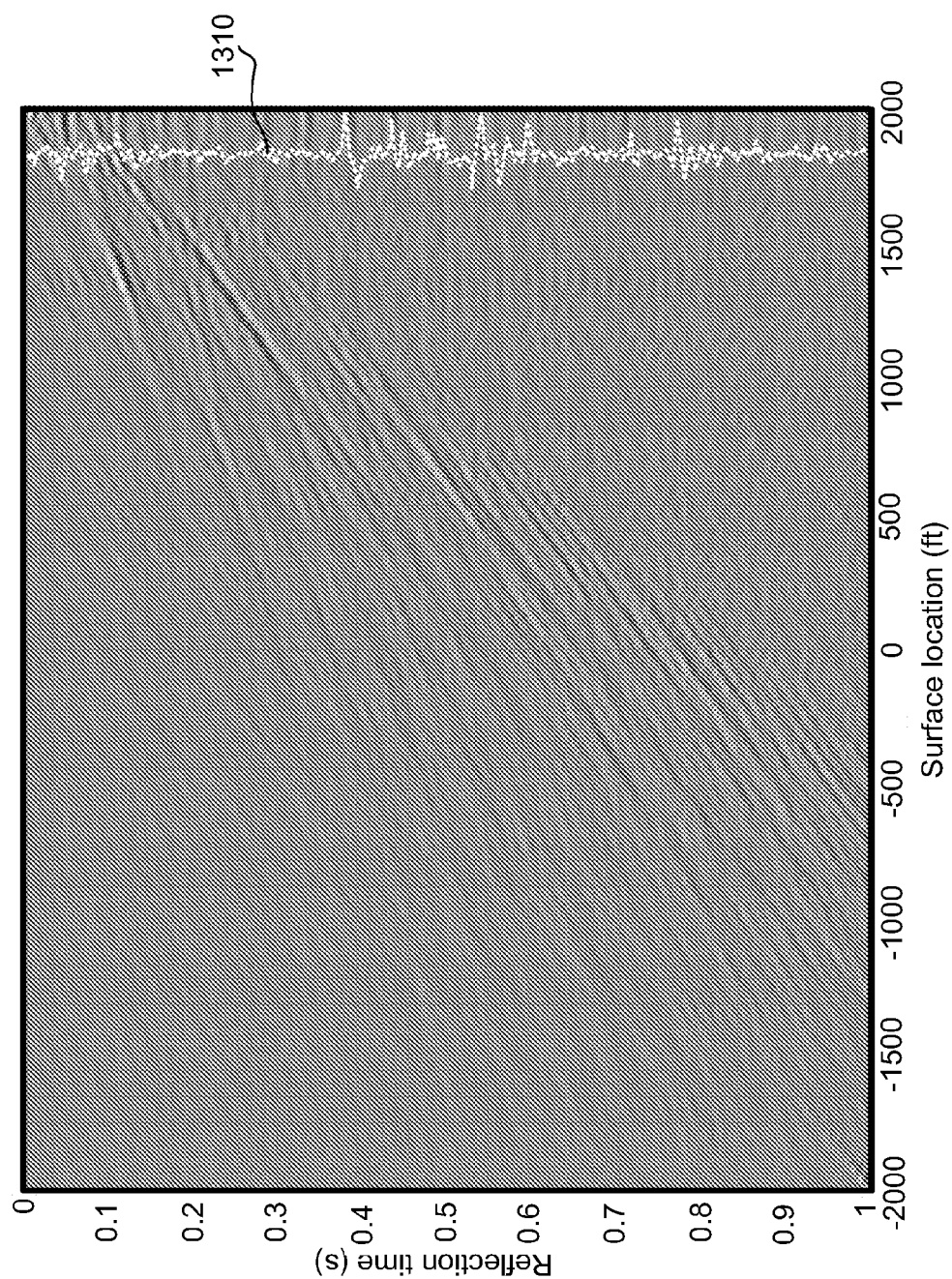
FIG. 18 shows an example of fk-filted surface-seismic traces that have been deconvolved using a semblance-weighted deconvolution operator based on the source signature shown in FIG. 10, estimated from the Walk-away VSP, and the total energy from the surface-recorded data.

FIG. 18 shows an example of fk-filted surface-seismic traces that have been deconvolved using a semblance-weighted deconvolution operator based on the source signature shown in FIG. 10, estimated from the Walk-away VSP, and the total energy from the surface-recorded data. The traces were acquired with the vibrator located just off the right-hand edge of the receiver line. The data have been deconvolved using a semblance-weighted deconvolution operator based on the source signature shown in FIG. 10, estimated from the Walk-away VSP, and the total energy from the surface-recorded data. Thus, in this example, the deconvolution is based on both the Walk-away and surface-seismic data. The synthetic multiple-free trace 1310 derived from the model is also shown.

Figure 19:
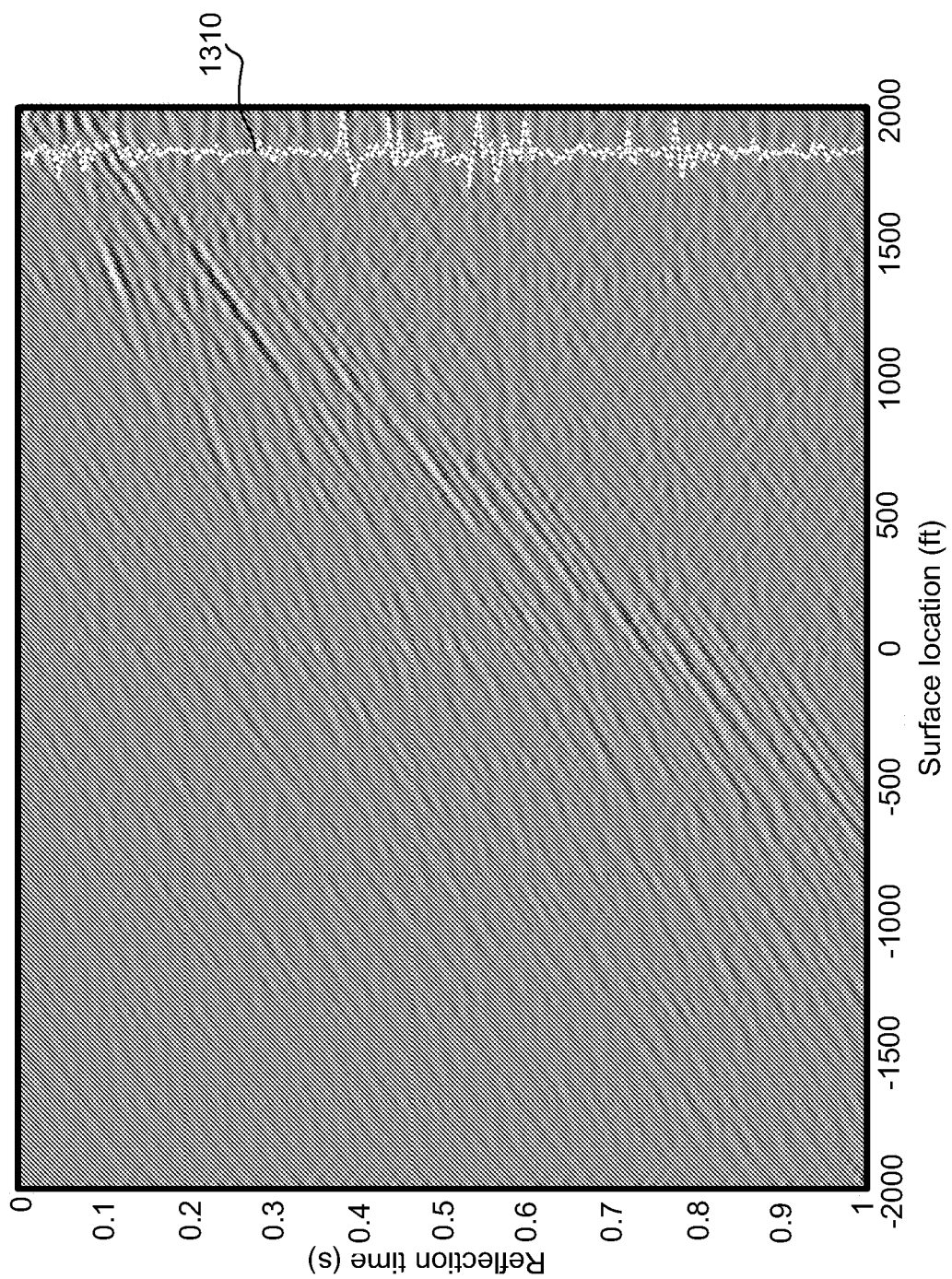
FIG. 19 shows an example of fk-filtered and attenuated surface-seismic traces that have been deconvolved using a semblance-weighted deconvolution operator based on both the VSP and surface data.

FIG. 19 shows an example of fk-filtered and attenuated surface-seismic traces that have deconvolved using a semblance-weighted deconvolution operator based on both the VSP and surface data. Following the steps described with respect to FIG. 18, the average transmission response was attenuated using a filter calculated from the Walk-away VSP and the synthetic sweep, as described with respect to FIG. 15.

This "hybrid" semblance-weighted deconvolution, shown in FIGS. 18 and 19, replaces the VSP energy in the denominator of Equation [4] with the average total energy as calculated from the surface-recorded traces:

$$\hat{E}_{ss}(\omega) = \frac{1}{N_{ss}} \sum_s \sum_x |x - x_s||D^{ss}(x, x_s, \omega)|^2 \quad [9]$$

The hybrid semblance-weighted deconvolution can therefore be expresses as:

$$F(\omega) = \frac{\hat{f}^*(\omega)}{\hat{E}_{ss}(\omega)} \quad [10]$$

The most compelling difference compared to the previous result using the semblance-weighted deconvolution operator derived from the Walk-away VSP alone is the apparent better handling of the surface waves.

We should note that the different VSP-derived operators only differ in the amplitude spectra and the phase spectra are all the same. The different operators have profoundly different effect applied to the air-coupled surface waves and to the body waves.

As discussed, with accurate, independent knowledge of $S(\omega)$, the Walk-away VSP will give the Green's function which can be deconvolved out of the migrated image (as opposed to correlated as suggested by Brandsberg-Dahl, et al.). We could alternatively use the transit times as shown in FIG. 6 and the approximate Green's functions from FIG. 7 either explicitly or implicitly in the migration process. However, to the extent that these travel times and Green's functions are (sometimes) strongly dependent on the near-surface conditions, in many applications the less ambitious objective of correcting for the average Green's function post-migration may be yield satisfactory results. Absent knowledge of $S(\omega)$, we have simply assumed that we know it (which we do for these synthetic data), and used this when calculating the filter $\Phi(\omega)$ in Equation [5]. The resulting inverse filter $\Phi(t)$ is shown in FIG. 12. This filter should be correlated with the data after deconvolution using the VSP derived signal. The event leading the main spike by about 45 ms, represent a short-period multiple seen in FIG. 7 at around 0.45 sec. This multiple is likely the multiple seen to dominate the reference section in FIG. 13.

In FIGS. 15, 17 and 19 we show the effect of applying the additional operator $\Phi(\omega)$ from Equation [5] with the objective to further reduce the effects from the transmission through the overburden. As stated above, FIGS. 15, 17 and 19 are fk-filtered and shown with the multiple-free synthetic response (to be compared to the "reference-correlated" section in FIG. 13).

The time-alignment from the application of the VSP-derived operators are most accurate at the depth of the VSP tool, and for the full benefits of these operator for the surface-seismic data, one may want to record VSP data to the surface. Additionally, the accuracy decreases the further the data corrections are extended away from the well bore.

The methods described herein can be used to estimate and remove wavefield distortions, originating either in the seismic source itself, or in the transmission through the overburden down to the depth of interest. The technique tends to have the greatest accuracy where the down-hole Walk-away VSP measurements are made with the VSP tool in or near the depth of interest, or at least where the depth of the borehole receiver measurement are made above the depth of interest. For vibratory land-based sources, it is preferable due to increased accuracy to acquire the Walk-away VSP data simultaneously with the surface-seismic data, and using a similar surface aperture.

Picking travel times for the Walk-away VSP traces, and subsequently aligning and stacking these traces will generate a response very similar to the stacking traditionally done in migrating surface-seismic data. The framework describes how this may be exploited to enhance the surface-recorded data by deconvolving surface-seismic with Walk-away data.

The inverse operator to be applied to surface-seismic data is the inverse of the stacked walk-away VSP. When applied to uncorrelated vibrator data, this may enable the use of harmonically distorted components of the wave-field for higher-resolution imaging. When applied to correlated vibrator data, the processes described can be used to find images partly or in-whole corrected for the transmission response of the overburden.

According to further embodiments, the methods described are extended to a 3D setting, combining 3D surface-seismics with 3D VSP, as will be understood by those skilled in the art.

It will be understood to those skilled in the art that various alternatives to the described configuration can be used to acquire and process seismic data using a vibratory seismic source. Some types of seismic vibrators, for instance, are designed to be used under water in a marine data acquisition environment. Instead of forming part of a wireline tool, the seismic sensors may be permanently or semi-permanently installed in the formation or may alternatively form part of a logging while drilling (LWD) tool. Data from the seismic sensors can be transmitted to the surface using permanently or semi-permanently installed cables, using wired drill pipe, using mud pulse transmission systems, using wireless transmission systems, etc. In a marine environment, the array of seismic sensors may be suspended in the water column, such as beneath a buoy.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for processing surface seismic data comprising:

receiving surface seismic data representing seismic signals detected at a plurality of surface locations;

estimating from borehole seismic data, travel times of direct wave arrivals between a surface seismic source and one or more locations in a borehole; and wavefield deconvolving said surface seismic data based at least in part on the estimated travel times of direct wave arrivals wherein the wavefield deconvolution is semblance-weighted.

2. A method according to claim 1 wherein the surface seismic data is wavefield deconvolved based at least in part on a combination of the surface seismic data and the estimated travel times of the direct wave arrivals.

3. A method according to claim 2 further comprising estimating wavefield energy from the surface seismic data and wherein the seismic data is wavefield deconvolved based at least in part on a combination of the estimated wavefield energy and the estimated direct travel times.

4. A method according to claim 1 wherein the surface seismic source is a vibratory source.

5. A method according to claim 4 wherein the vibratory source is on land and the plurality of surface locations are on land.

6. A method according to claim 5 wherein the seismic signals represented in the surface seismic data originate from said surface seismic source while at the same position as used to generate the direct waves towards the one or more borehole locations.

7. A method according to claim 6 wherein the surface seismic data and borehole seismic data are recorded simultaneously.

8. A method according to claim 1 wherein the plurality of surface locations and the borehole are in a marine environment.

9. A method according to claim 8 wherein the surface locations are positions of a plurality of hydrophones in streamer towed by a seismic vessel, and the seismic source is an airgun.

10. A method according to claim 1 further comprising applying an f-k filter to the results of the wavefield deconvolution.

11. A method according to claim 1, wherein estimating said travel times of direct wave arrivals between the seismic source and the one or more locations in the borehole comprises correlating said borehole seismic data with the seismic source's reference signal or an estimate of seismic source's actual source signature and picking first breaks/initial arrivals of seismic energy from the correlated seismic data.

12. A method according to claim 1, wherein said wavefield deconvolution comprises calculating an expectation value by a mean or a median operation.

13. A system for processing seismic data comprising:
a storage system adapted to receive surface seismic data representing seismic signals detected at a plurality of surface locations, and borehole seismic data representing seismic signals detected at one or more locations in a borehole; and a processing system programmed and in communication with the storage system such that travel times of direct wave arrivals between a seismic source and the one or more location in the borehole can be estimated, and such that said surface seismic data can be wavefield deconvolved based at least in part on the estimated travel times of the direct wave arrivals wherein the wavefield deconvolution is semblance-weighted.

14. A system according to claim 13 wherein the surface seismic data is wavefield deconvolved based at least in part on a combination of the surface seismic data and the estimated travel times of the direct wave arrivals.

15. A system according to claim 14 wherein the processing system is further programmed to estimate wavefield energy from the surface seismic data, and wherein the seismic data is wavefield deconvolved based at least in part on a combination of the estimated wavefield energy and the estimated direct travel times.

16. A system according to claim 13 wherein the surface seismic source is a vibratory source, the vibratory source is on land and the plurality of surface locations are on land.

17. A system according to claim 13 wherein the plurality of surface locations and the borehole are in a marine environment, the surface locations are positions of a plurality of hydrophones in streamer towed by a seismic vessel, and the seismic source is an airgun.

18. A system according to claim 13 wherein the processing system is further programmed to apply an f-k filter to the results of the wavefield deconvolution.

19. A system according to claim 13, wherein said travel times of direct wave arrivals between the seismic source and the one or more locations in the borehole is estimated by correlating said borehole seismic data with the seismic source's reference signal or an estimate of seismic source's actual source signature and picking first breaks/initial arrivals of seismic energy from the correlated seismic data.

20. An article of manufacture, comprising:
a computer useable medium having computer readable program code means embodied therein for processing seismic data, the computer readable program code means in said article of manufacture comprising:
computer readable program means for estimating from borehole seismic data, travel times of direct wave arrivals between a surface seismic source and one or more locations in a borehole; and
computer readable program means for wavefield deconvolving surface seismic data representing seismic signals detected at a plurality of surface locations, wherein the wavefield deconvolving is based at least in part on the estimated travel times of direct wave arrivals, and wherein the wavefield deconvolving is semblance-weighted.

* * * * *